US012189031B2

(12) United States Patent
Masuda et al.

(10) Patent No.: US 12,189,031 B2
(45) Date of Patent: *Jan. 7, 2025

(54) DISTANCE IMAGE ACQUISITION APPARATUS AND DISTANCE IMAGE ACQUISITION METHOD

(71) Applicant: FUJIFILM Corporation, Tokyo (JP)

(72) Inventors: Tomonori Masuda, Saitama (JP); Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 305 days.

This patent is subject to a terminal disclaimer.

(21) Appl. No.: 17/133,889

(22) Filed: Dec. 24, 2020

(65) Prior Publication Data

US 2021/0116565 A1 Apr. 22, 2021

Related U.S. Application Data

(63) Continuation of application No. 15/712,521, filed on Sep. 22, 2017, now Pat. No. 10,908,288, which is a (Continued)

(30) Foreign Application Priority Data

Mar. 26, 2015 (JP) .................. 2015-064773

(51) Int. Cl.
*G01S 17/32* (2020.01)
*G01C 3/06* (2006.01)
(Continued)

(52) U.S. Cl.
CPC ............... *G01S 17/32* (2013.01); *G01C 3/06* (2013.01); *G01S 7/4865* (2013.01); (Continued)

(58) Field of Classification Search
None
See application file for complete search history.

(56) References Cited

U.S. PATENT DOCUMENTS 6,173,122 B1  1/2001  Matsumoto et al.
6,373,557 B1  4/2002  Mengel et al.
(Continued)

FOREIGN PATENT DOCUMENTS

CN   1418321 A    5/2003
CN   1713742 A   12/2005
(Continued)

OTHER PUBLICATIONS

Chinese Office Action and Search Report for Chinese Application No. 201580078154.5, dated Nov. 4, 2019, with English translation.
(Continued)

*Primary Examiner* — Hovhannes Baghdasaryan
(74) *Attorney, Agent, or Firm* — Birch, Stewart, Kolasch & Birch, LLP

(57) ABSTRACT

Disclosed are a distance image acquisition apparatus and a distance image acquisition method capable of achieving high distance measurement accuracy and omitting wasteful imaging or calculation. The distance image acquisition apparatus (10) includes a distance image sensor (14), a drive mode setting unit (20A), a distance image generation unit (20B), a pulse light emission unit (22), and an exposure control unit (24). The exposure control unit (24) controls emission and non-emission of pulse light emitted from the pulse light emission unit (22) according to a drive mode set by the drive mode setting unit (20A), and controls exposure in the distance image sensor (14). The distance image generation unit (20B) performs calculation processing of a sensor output acquired from the distance image sensor (14) according to the drive mode set by the drive mode setting unit (20A) to generate a distance image corresponding to a distance of a subject.

9 Claims, 17 Drawing Sheets

Related U.S. Application Data continuation of application No. PCT/JP2015/080579, filed on Oct. 29, 2015.

(51) Int. Cl.

| | |
|---|---|
| *G01S 7/486* | (2020.01) |
| *G01S 7/4865* | (2020.01) |
| *G01S 7/487* | (2006.01) |
| *G01S 17/10* | (2020.01) |
| *G01S 17/89* | (2020.01) |
| *G01S 17/894* | (2020.01) |
| *H04N 23/667* | (2023.01) |
| *H04N 23/73* | (2023.01) |
| *H04N 25/702* | (2023.01) |
| *G03B 7/083* | (2021.01) |
| *H04N 23/74* | (2023.01) |

(52) U.S. Cl.
CPC ............ *G01S 7/4868* (2013.01); *G01S 7/487* (2013.01); *G01S 17/10* (2013.01); *G01S 17/89* (2013.01); *G01S 17/894* (2020.01); *H04N 23/667* (2023.01); *H04N 23/73* (2023.01); *H04N 25/702* (2023.01); *G03B 7/083* (2013.01); *H04N 23/74* (2023.01)

(56) References Cited

U.S. PATENT DOCUMENTS

| | | | | |
|---|---|---|---|---|
| 7,787,131 B1* | 8/2010 | Moran | ............... | G01B 9/02098 356/520 |
| 7,940,377 B1* | 5/2011 | Schmitt | ................ | G01J 3/0208 356/3.01 |
| 2003/0147050 A1 | 8/2003 | Nakamura | | |
| 2005/0285945 A1 | 12/2005 | Usui et al. | | |
| 2008/0100821 A1 | 5/2008 | Yabe | | |
| 2008/0186475 A1* | 8/2008 | Kawata | ................... | G01S 17/58 356/73 |

FOREIGN PATENT DOCUMENTS

| | | | |
|---|---|---|---|
| CN | 101153913 A | 4/2008 | |
| JP | 10-512954 A | 12/1998 | |
| JP | 11-183183 A | 7/1999 | |
| JP | 2001-148868 A | 5/2001 | |
| JP | 2002-500367 A | 1/2002 | |
| JP | 2008-83001 A | 4/2008 | |
| JP | 2008-145386 A | 6/2008 | |
| JP | 2009-047475 A | 3/2009 | |
| JP | 2013-173529 A | 9/2013 | |
| JP | 2014-021100 A | 2/2014 | |
| WO | WO 96/22509 A1 | 7/1996 | |
| WO | WO 2009/105857 A1 | 9/2009 | |

OTHER PUBLICATIONS

Decision to Grant a Patent dated May 2, 2018, issued in Japanese Patent Application No. 2017-507320, with a Machine English translation.

International Preliminary Report on Patentability and Written Opinion of the International Searching Authority (Forms PCT/IB/326, PCT/IB/373 and PCT/ISA/237) issued in International Application No. PCT/JP2015/080579 on Oct. 5, 2017, together with an English translation.

International Search Report (Form PCT/ISA/210) issued in International Application No. PCT/JP2015/080579 on Jan. 26, 2016, together with an English translation.

\* cited by examiner

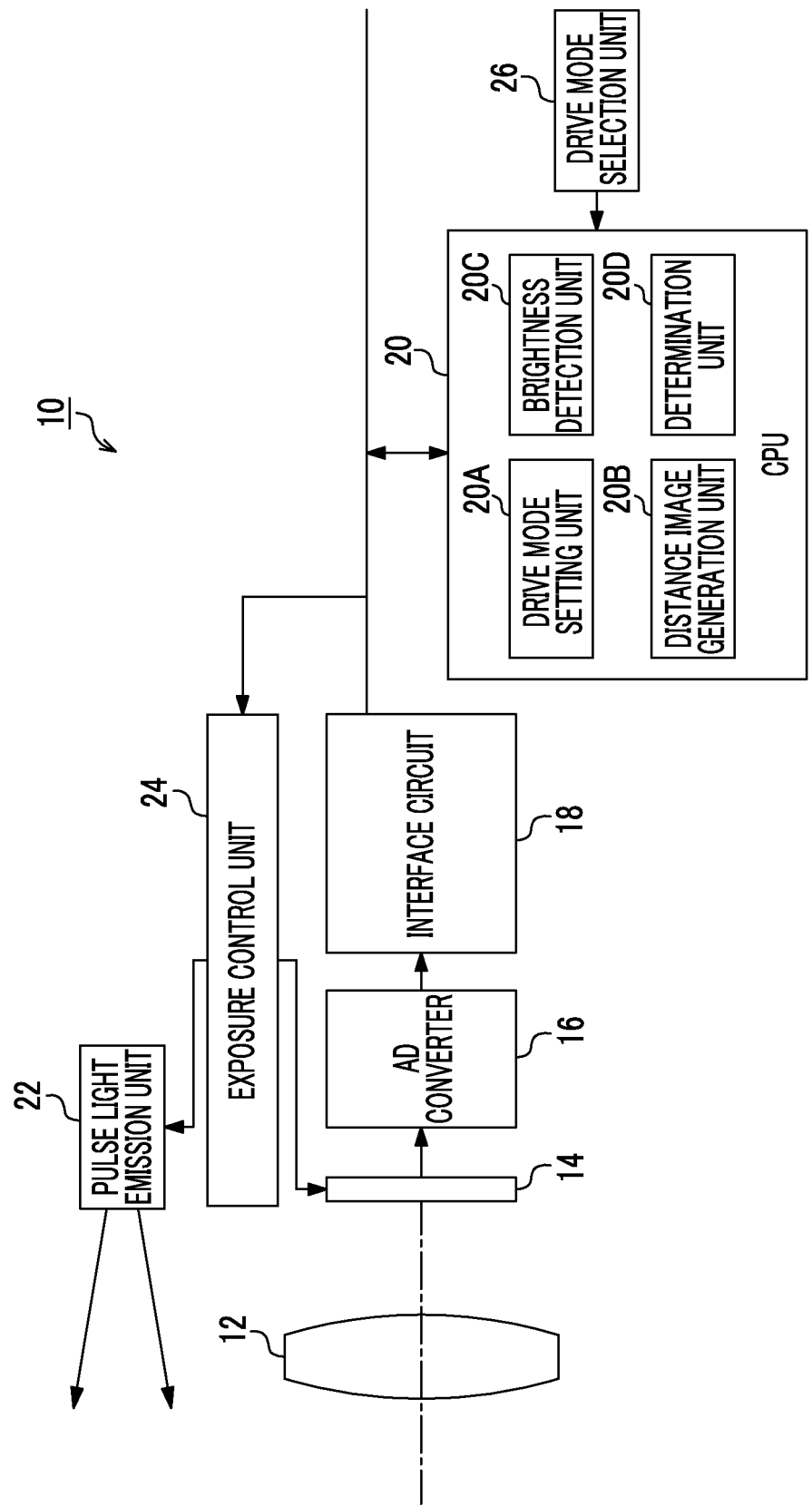

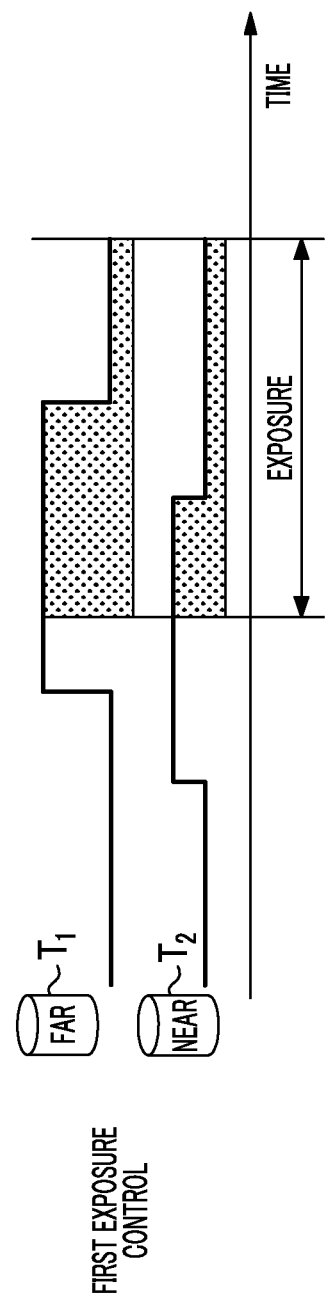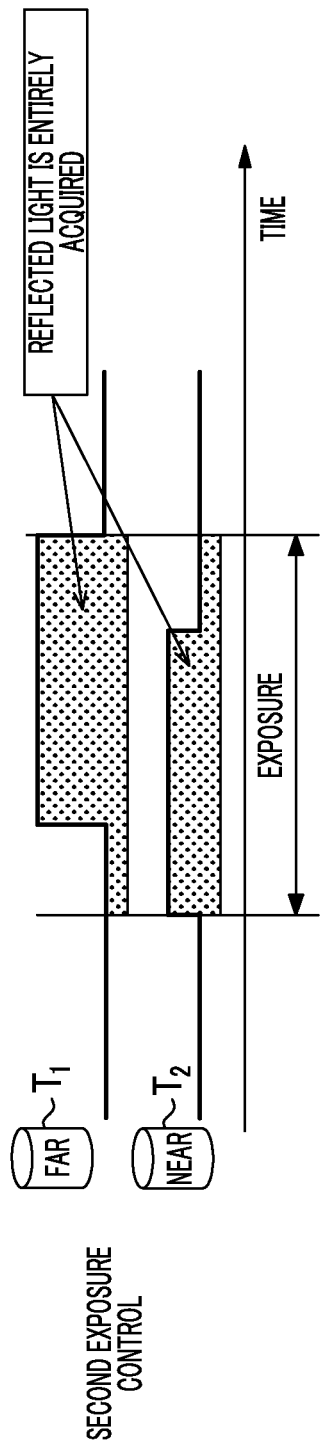

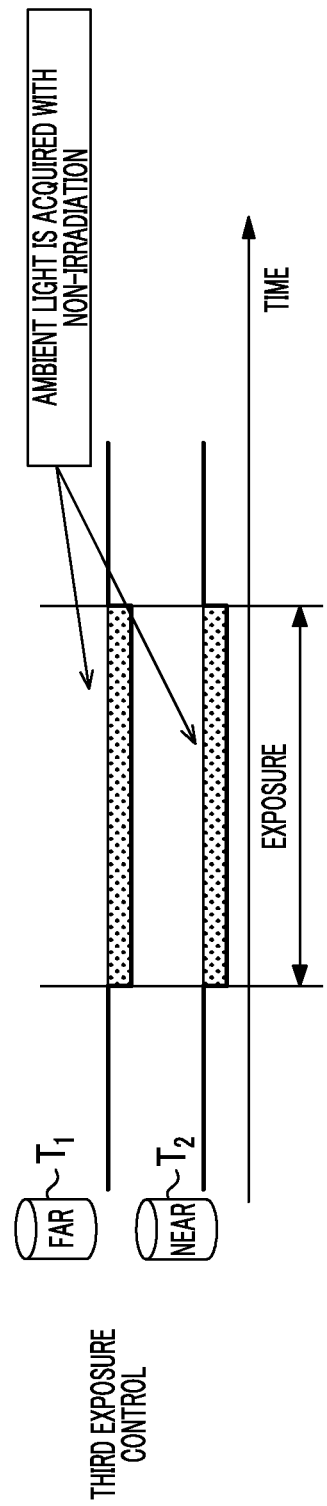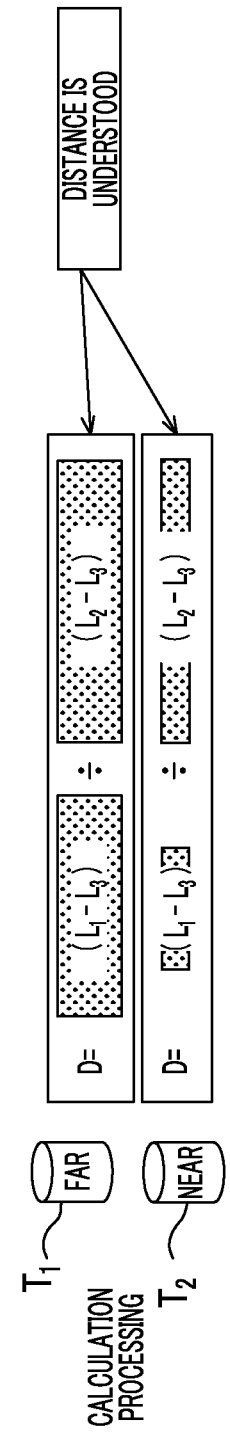

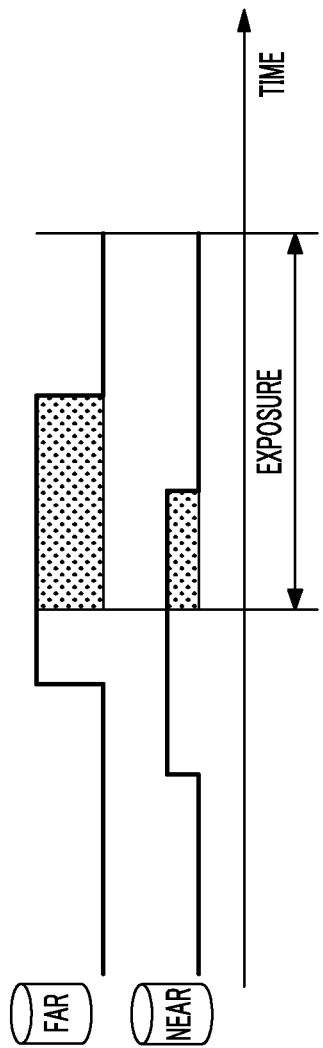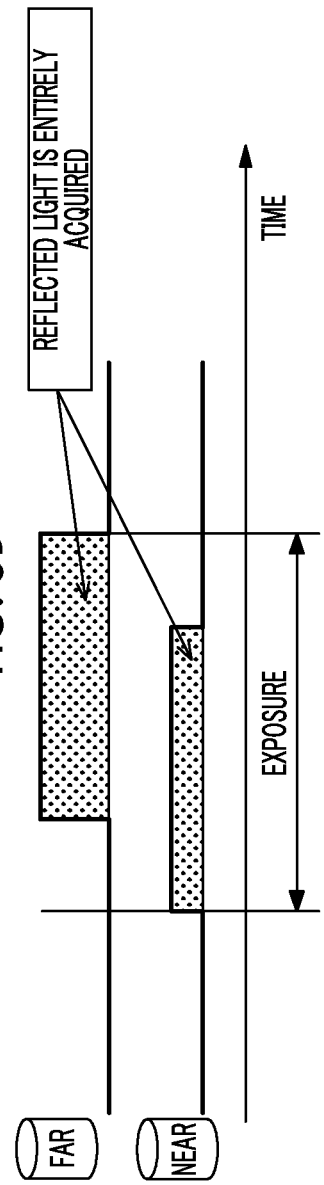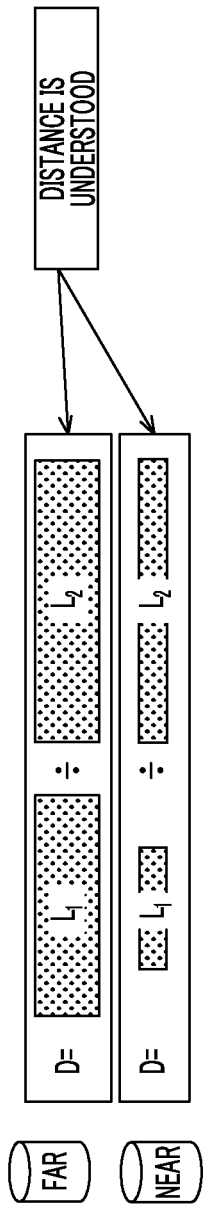

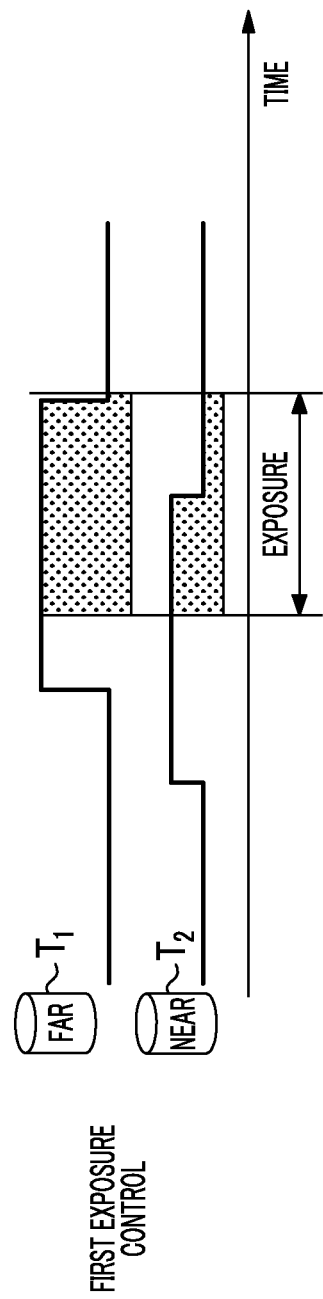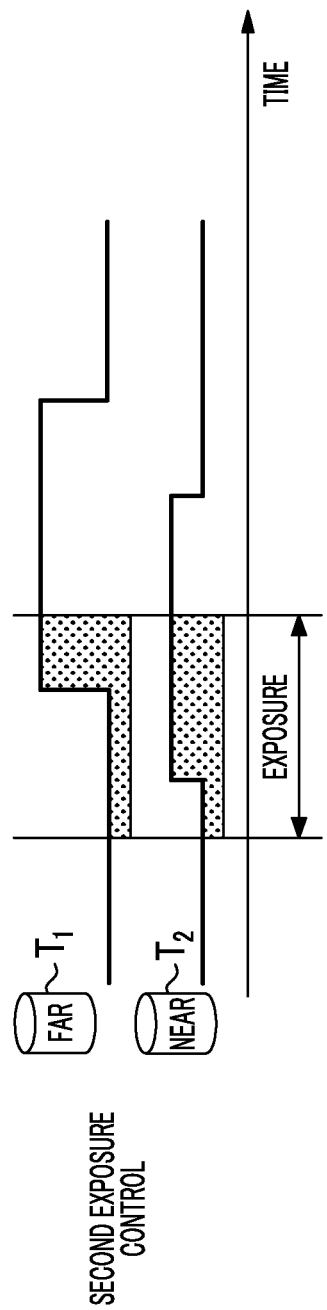

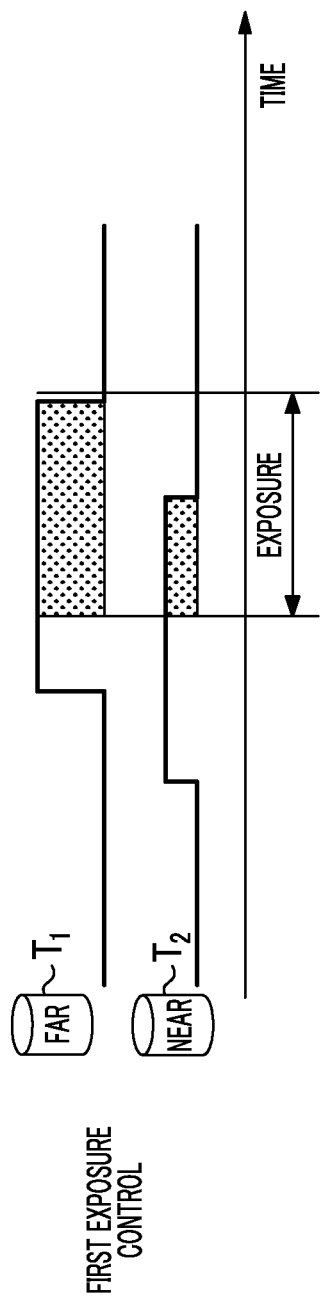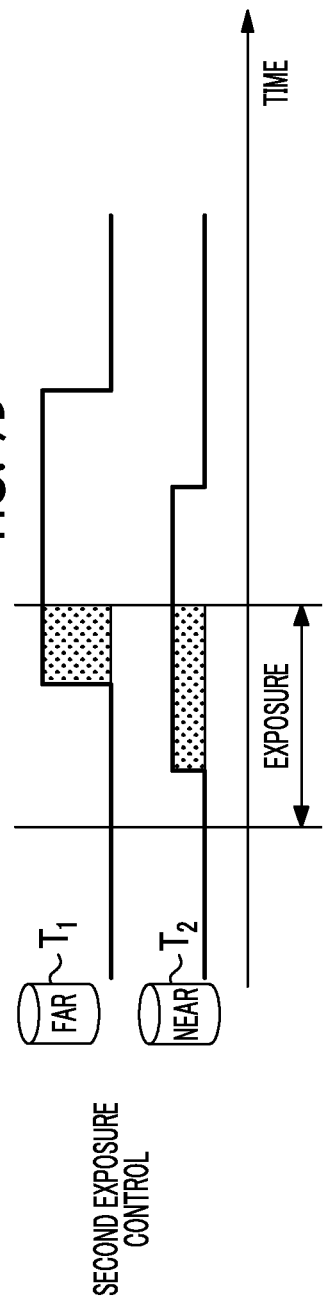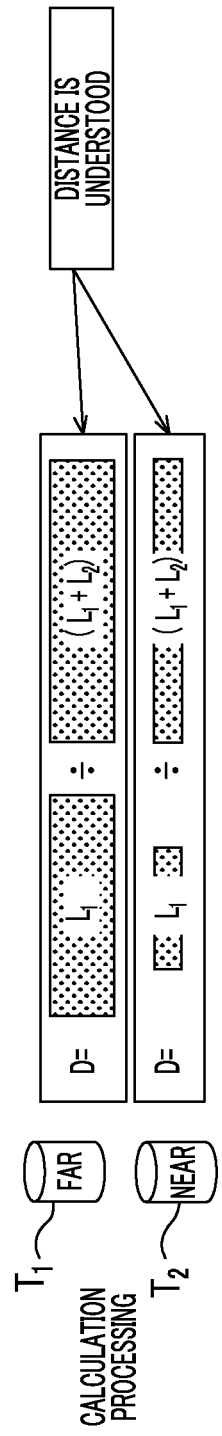

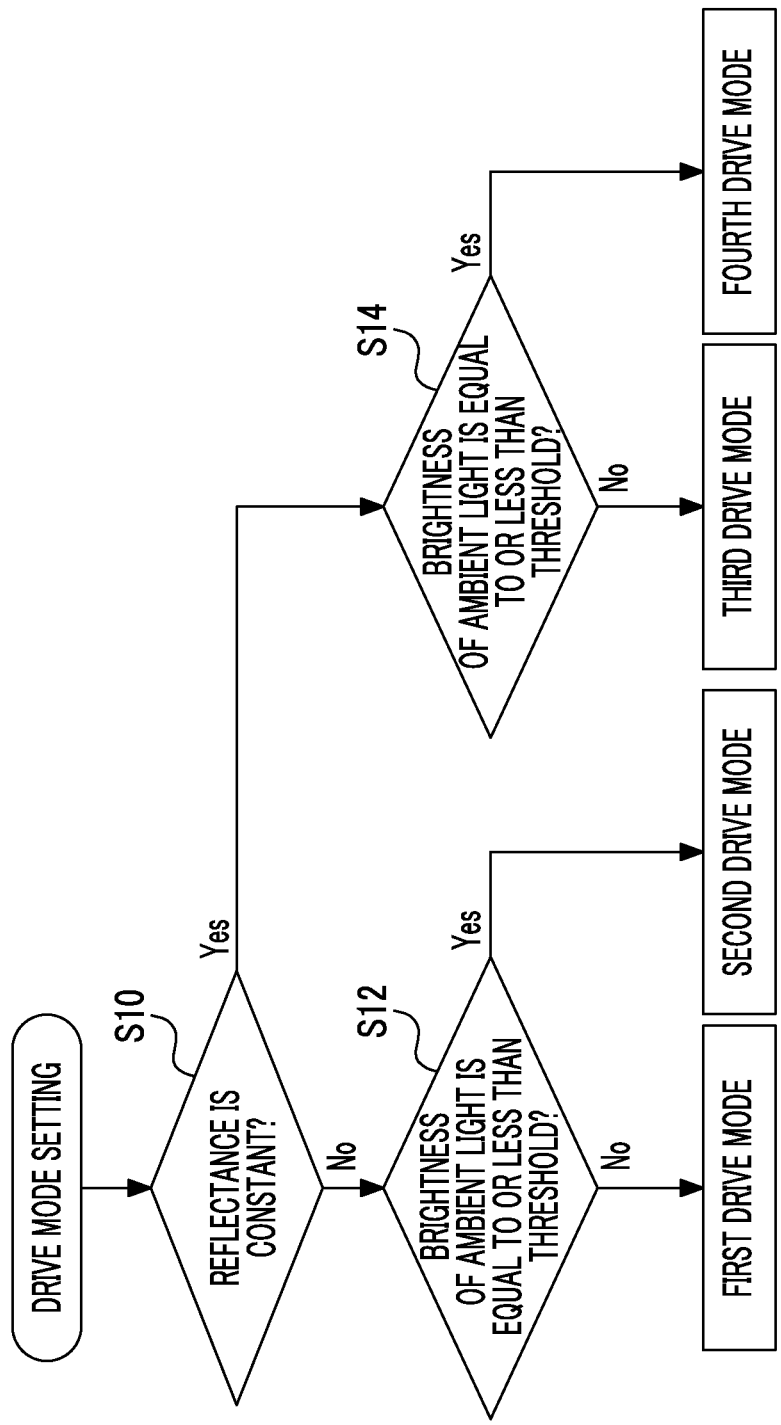

DISTANCE IMAGE ACQUISITION APPARATUS AND DISTANCE IMAGE ACQUISITION METHOD

CROSS-REFERENCE TO RELATED APPLICATIONS

The present application is a Continuation of U.S. patent application Ser. No. 15/712,521 filed Sep. 22, 2017, which is a Continuation of PCT International Application No. PCT/JP2015/080579 filed on Oct. 29, 2015 claiming priority under 35 U.S.C § 119(a) to Japanese Patent Application No. 2015-064773 filed on Mar. 26, 2015. Each of the above applications is hereby expressly incorporated by reference, in their entirety, into the present application.

BACKGROUND OF THE INVENTION

1. Field of the Invention

The present invention relates to a distance image acquisition apparatus and a distance image acquisition method, and in particular, to a technique for acquiring a distance image using a time of flight (TOF) system.

2. Description of the Related Art

A TOF system is a system which irradiates a subject with light and obtains a distance to the subject by measuring a time until reflected light is received by a sensor. A system (hereinafter, referred to as a "pulse light detection system") which irradiates the subject with pulse light, receives reflected light with a distance image sensor having a plurality of pixels, and acquires a distance image of a subject from the amount of received light (light reception intensity) of each pixel of the distance image sensor, and a system which irradiates the subject with light modulated at a high frequency and acquires a distance image by detecting a phase shift (arrival time of reflected light) until reflected light is received from an irradiation time are known.

On the other hand, since the pulse light detection system is a system which measures the distance of the subject from the amount of received light of each pixel using the correlation between the distance to the subject and the amount of received light of pulse light received at each pixel of the distance image sensor, in a case where external light (ambient light) other than pulse light is received, it is not possible to accurately measure the distance of the subject. Furthermore, since the amount of received light also changes depending on the reflectance of the subject, there is a problem in that it is not possible to accurately measure the distance of the subject.

In order to solve the above-described problem, a distance image acquisition apparatus described in JP2008-145386A comprises a distance image sensor in which a first pixel group having a first band-pass filter centering on infrared light having a wavelength $\lambda_1$ and a second pixel group having a second band-pass filter centering on infrared light having a wavelength $\lambda_2$ and having a light transmission band not overlapping a light transmission band of the first band-pass filter are arranged in a predetermined arrangement, and a light emission unit which emits pulse light of infrared light having the wavelength $\lambda_2$. The distance image acquisition apparatus emits pulse light of infrared light having the wavelength $\lambda_2$ from the light emission unit, acquires output data from the first pixel group and the second pixel group of the distance image sensor, and subtracts output data of the first pixel group from output data of the second pixel group, thereby acquiring output data with the influence of ambient light eliminated.

JP2008-145386A describes a technique which sets an exposure time such that reflected light from a farthest subject within a distance measurement range is entirely received, acquires output data (data indicating information regarding the reflectance of the subject) of the distance image sensor captured for the exposure time, and divides separately captured output data (data including the distance of the subject and information regarding the reflectance) of the distance image sensor by the acquired output data, thereby acquiring output data with the influence of the reflectance of the subject eliminated.

SUMMARY OF THE INVENTION

In the distance image acquisition apparatus described in JP2008-145386A, in a case of acquiring a distance image with the pulse light detection system, since the influence of external light (ambient light) other than pulse light for distance measurement is eliminated, it is possible to perform a distance measurement with high accuracy; however, in order to eliminate the influence of ambient light, it is necessary to use the distance image sensor in which the first pixel group having the first band-pass filter centering on infrared light having the wavelength $\lambda_1$ and the second pixel group having the second band-pass filter centering on infrared light having the wavelength $\lambda_2$ are arranged in the predetermined arrangement, and to subtract output data of the first pixel group from output data of the second pixel group.

That is, in the distance image acquisition apparatus described in JP2008-145386A, since output data of the first pixel group of the distance image sensor is subtracted from output data of the second pixel group of the distance image sensor, shot noise caused by the subtraction processing is superimposed on the subtracted output data, and for example, in a case of an imaging environment in which ambient light is not exposed, there is a problem in that distance measurement accuracy is rather deteriorated due to processing for eliminating the influence of ambient light.

It is necessary to use a special distance image sensor, and since the first pixel group and the second pixel group of the distance image sensor have sensitivity to different frequency bandwidths, the amount of received ambient light detected by the first pixel group does not necessarily match the amount of received ambient light detected by the second pixel group. In this case, it is not possible to completely eliminate the influence of ambient light.

A method is known in which, a general distance image sensor having sensitivity to infrared light is used instead of the special distance image sensor described in JP2008-145386A, imaging with pulse light of infrared light being emitted and imaging with pulse light being not emitted are performed, and a distance image with the influence of ambient light eliminated is acquired based on a differential image between images acquired by the two times of imaging; however, in this case, noise caused by each of the two times of imaging is superimposed on the differential image, and there is a problem that distance measurement accuracy is deteriorated.

JP2008-145386A describes a technique which eliminates the influence of the reflectance of the subject in a case of acquiring a distance image with the pulse light detection system; however, in this case, it is necessary to perform another imaging in order to eliminate the influence of the reflectance of the subject, it is necessary to perform division calculation for eliminating the influence of the reflectance of the subject, and in a case of an imaging environment in which a subject having constant reflectance is imaged, there is a problem in that distance measurement accuracy is rather deteriorated due to processing for eliminating the influence of the reflectance.

The invention has been accomplished in consideration of such a situation, and an object of the invention is to provide a distance image acquisition apparatus and a distance image acquisition method capable of achieving high distance measurement accuracy and omitting wasteful imaging or calculation.

In order to attain the above-described object, a distance image acquisition apparatus according to an aspect of the invention comprises a distance image sensor in which a plurality of light receiving elements are arranged in a two-dimensional manner, a pulse light emission unit which irradiates a subject within a distance measurement region with pulse light, an imaging lens which images reflected light of the pulse light irradiated from at least the pulse light emission unit and reflected from the subject on the distance image sensor, a drive mode setting unit which has two or more drive modes among a first drive mode, in which first exposure control, second exposure control, and third exposure control are performed, in the first exposure control, pulse light being emitted from the pulse light emission unit and a difference in exposure between the corresponding light receiving elements of the distance image sensor being generated according to at least a distance of the subject, in the second exposure control, pulse light being emitted from the pulse light emission unit and a phase of exposure start with respect to the pulse light being made different from a phase of exposure start with respect to the pulse light of the first exposure control, and in the third exposure control, exposure to reflected light from the subject being performed without emitting pulse light from the pulse light emission unit, a second drive mode, in which the first exposure control and the second exposure control are performed, a third drive mode, in which the first exposure control and the third exposure control are performed, and a fourth drive mode, in which the first exposure control is performed, and sets one drive mode out of the two or more drive modes, an exposure control unit which controls exposure in the distance image sensor according to a drive mode set by the drive mode setting unit, and a distance image generation unit which generates a distance image corresponding to the distance of the subject within the distance measurement region based on an output of the distance image sensor subjected to exposure control by the exposure control unit.

The inventors have found that, in an imaging environment in which there is no influence of ambient light or in an imaging environment in which a subject with no influence of reflectance is imaged, in a case where multiple times of imaging are performed in order to eliminate the influence of ambient light or reflectance, and calculation processing for eliminating the influence of ambient light or reflectance is performed based on data acquired by multiple times of imaging, distance measurement accuracy is rather deteriorated.

Accordingly, according to the aspect of the invention, a plurality of drive modes having different numbers of times of exposure or different exposure contents are provided, an optimum drive mode according to an imaging environment is set, exposure control is performed according to the set drive mode, and a distance image is generated from data acquired by the exposure control, whereby it is possible to acquire a distance image with high measurement accuracy.

According to another aspect of the invention, in the distance image acquisition apparatus, the second exposure control is exposure control in which pulse light is emitted from the pulse light emission unit, exposure starts simultaneously with the emission of the pulse light, and all of the light receiving elements of the distance image sensor are entirely exposed to the pulse light reflected from the subject, and in a case where the first drive mode is set by the drive mode setting unit, the distance image generation unit uses first data, second data, and third data acquired from the distance image sensor by the first exposure control, the second exposure control, and the third exposure control, respectively, calculates first subtraction data by subtracting the third data corresponding to the same exposure time as an exposure time by the first exposure control from the first data, calculates second subtraction data by subtracting the third data corresponding to the same exposure time as the exposure time by the first exposure control from the second data, and generates the distance image based on division data obtained by dividing the first subtraction data by the second subtraction data.

The first drive mode is a mode which is set in a case of an imaging environment, in which there is the influence of ambient light and the reflectance of the subject, and in the first drive mode, the first exposure control, the second exposure control, and the third exposure control are performed in order to eliminate the influence of ambient light and reflectance, and first data, second data, and third data are acquired, respectively.

The first subtraction data obtained by subtracting the third data corresponding to the same exposure time as the exposure time by the first exposure control from the first data is data according to the distance and reflectance of the subject with the influence of ambient light eliminated, and the second subtraction data obtained by subtracting the third data corresponding to the same exposure time as the exposure time by the second exposure control from the second data is data according to the reflectance of the subject with the influence of ambient light eliminated. Then, the division data obtained by dividing the first subtraction data by the second subtraction data becomes data corresponding to only the distance of the subject with the influence of ambient light and the reflectance of the subject eliminated. Therefore, it is possible to generate a distance image with the influence of ambient light and the reflectance of the subject eliminated based on the division data obtained by calculating in the above-described manner.

According to a further aspect of the invention, in the distance image acquisition apparatus, it is preferable that the second exposure control is exposure control in which pulse light is emitted from the pulse light emission unit, an exposure period is set not to overlap an exposure period by the first exposure control, an exposure time is set to be continuous to an exposure time by the first exposure control, and in a case of totaling an output obtained from the distance image sensor by the first exposure control and an output obtained from the distance image sensor by the second exposure control, an output with entirely exposed to the pulse light reflected from the subject is obtained, and in a case where the first drive mode is set by the drive mode setting unit, the distance image generation unit uses first data, second data, and third data acquired from the distance image sensor by the first exposure control, the second exposure control, and the third exposure control, respectively, calculates first subtraction data by subtracting the third data corresponding to the same exposure time as the exposure time of the first exposure control from the first data, calculates second subtraction data by subtracting the third data corresponding to a total exposure time of the exposure time by the first exposure control and the exposure time by the second exposure control from addition data obtained by adding the first data and the second data, and generates the distance image based on division data obtained by dividing the first subtraction data by the second subtraction data.

The first subtraction data obtained by subtracting the third data corresponding to the same exposure time as the exposure time by the first exposure control from the first data is data according to the distance and reflectance of the subject with the influence of ambient light eliminated, and the second subtraction data obtained by subtracting the third data corresponding to the total exposure time of the exposure time by the first exposure control and the exposure time by the second exposure control from the addition data obtained by adding the first data and the second data is data according to the reflectance of the subject with the influence of ambient light eliminated. Then, the division data obtained by dividing the first subtraction data by the second subtraction data becomes data corresponding to only the distance of the subject with the influence of ambient light and the reflectance of the subject eliminated. Therefore, it is possible to generate a distance image with the influence of ambient light and the reflectance of the subject eliminated based on the division data obtained by calculating in the above-described manner.

According to still another aspect of the invention, in the distance image acquisition apparatus, it is preferable that the second exposure control is exposure control in which pulse light is emitted from the pulse light emission unit, exposure starts simultaneously with the emission of the pulse light, and all of the light receiving elements of the distance image sensor are entirely exposed to the pulse light reflected from the subject, and in a case where the second drive mode is set by the drive mode setting unit, the distance image generation unit uses first data and second data acquired from the distance image sensor by the first exposure control and the second exposure control, respectively, and generates the distance image based on division data obtained by dividing the first data by the second data.

The second drive mode is a mode which is set in a case of an imaging environment, in which there is no influence of ambient light, and in the second drive mode, the first exposure control and the second exposure control are performed in order to eliminate the influence of reflectance, and the first data and the second data are acquired, respectively. Then, the division data obtained by dividing the first data by the second data becomes data corresponding to only the distance of the subject with the influence of the reflectance of the subject eliminated. Therefore, it is possible to generate a distance image with the influence of the reflectance of the subject eliminated based on the division data obtained by calculating in the above-described manner, and in particular, since exposure control or calculation for eliminating the influence of ambient light is not performed, it is possible to increase distance measurement accuracy and to omit wasteful imaging and calculation.

According to still another aspect of the invention, in the distance image acquisition apparatus, it is preferable that the second exposure control is exposure control in which pulse light is emitted from the pulse light emission unit, an exposure period is set not to overlap an exposure period by the first exposure control, an exposure time is set to be continuous to an exposure time by the first exposure control, and in a case of totaling an output obtained from the distance image sensor by the first exposure control and an output obtained from the distance image sensor by the second exposure control, an output with entirely exposed to the pulse light reflected from the subject is obtained, and in a case where the second drive mode is set by the drive mode setting unit, the distance image generation unit uses first data and second data acquired from the distance image sensor by the first exposure control and the second exposure control, respectively, and generates the distance image based on division data obtained by dividing the first data by addition data obtained by adding the first data and the second data.

The addition data obtained by adding the first data and the second data is data according to the reflectance of the subject with no influence of ambient light. The division data obtained by dividing the first data according to the distance and reflectance of the subject with no influence of ambient light by the addition data obtained by adding the first data and the second data according to the reflectance of the subject with no influence of ambient light becomes data corresponding to only the distance of the subject with the influence of the reflectance of the subject eliminated. Therefore, it is possible to generate a distance image with the influence of the reflectance of the subject eliminated based on the division data obtained by calculating in the above-described manner, and in particular, since exposure control or calculation for eliminating the influence of ambient light is not performed, it is possible to increase distance measurement accuracy and to omit wasteful imaging and calculation.

According to still another aspect of the invention, in the distance image acquisition apparatus, it is preferable that, in a case where the third drive mode is set by the drive mode setting unit, the distance image generation unit uses first data and third data acquired from the distance image sensor by the first exposure control and the third exposure control, respectively, and generates the distance image based on subtraction data obtained by subtracting the third data corresponding to the same exposure time as an exposure time by the first exposure control from the first data.

The third drive mode is a mode which is set in a case of an imaging environment, in which there is no influence of the reflectance of the subject, and in the third drive mode, the first exposure control and the third exposure control are performed in order to eliminate the influence of ambient light, and the first data and the third data are acquired, respectively. Then, the subtraction data obtained by subtracting the third data from the first data becomes data corresponding to only the distance of the subject with the influence of ambient light eliminated. Therefore, it is possible to generate a distance image with the influence of ambient light eliminated based on the subtraction data obtained by calculating in the above-described manner, and in particular, since exposure control or calculation for eliminating the influence of the reflectance of the subject is not performed, it is possible to increase distance measurement accuracy and to omit wasteful imaging and calculation.

According to still another aspect of the invention, in the distance image acquisition apparatus, it is preferable that, in a case where the fourth drive mode is set by the drive mode setting unit, the distance image generation unit generates the distance image based on first data acquired from the distance image sensor by the first exposure control.

The fourth drive mode is a mode which is set in a case of an imaging environment, in which there is no influence of ambient light and the reflectance of the subject, and in the fourth drive mode, the first exposure control is performed and the first data is acquired. The first data is data corresponding to only the distance of the subject. Therefore, it is possible to generate a distance image based on the first data, and in particular, since exposure control or calculation for eliminating the influence of ambient light and the reflectance of the subject is not performed, it is possible to increase distance measurement accuracy and to omit wasteful imaging and calculation.

According to still another aspect of the invention, it is preferable that the distance image acquisition apparatus further comprises a brightness detection unit which detects brightness of ambient light of the subject, and the drive mode setting unit sets one drive mode out of the second drive mode and the fourth drive mode when the brightness of ambient light detected by the brightness detection unit is equal to or less than a threshold set corresponding to measurement accuracy. As the threshold set corresponding to measurement accuracy, for example, a threshold for determining whether or not the brightness of ambient light is brightness corresponding to ambient light in the nighttime can be set, and in a case where the brightness of ambient light is equal to or less than the threshold set in this manner, the brightness of ambient light does not affect distance measurement accuracy.

According to still another aspect of the invention, it is preferable that the distance image acquisition apparatus further comprises a determination unit which determines whether or not reflectance of a subject for distance measurement is constant, and in a case where the determination unit determines that the reflectance of the subject for distance measurement is constant, the drive mode setting unit sets one drive mode out of the third drive mode and the fourth drive mode.

According to still another aspect of the invention, in the distance image acquisition apparatus, it is preferable that, in a case of tracking the subject for distance measurement, the determination unit determines that the reflectance of the subject for distance measurement is constant. For example, in a case of tracking a face of a person, it can be determined that the reflectance of the face of the person is constant.

According to still another aspect of the invention, it is preferable that the distance image acquisition apparatus further comprises a brightness detection unit which detects brightness of ambient light of the subject, and a determination unit which determines whether or not reflectance of a subject for distance measurement is constant, and in a case where the brightness of ambient light detected by the brightness detection unit is equal to or less than a threshold set corresponding to measurement accuracy, and the determination unit determines that the reflectance of the subject for distance measurement is constant, the drive mode setting unit sets the fourth drive mode.

According to still another aspect of the invention, it is preferable that the distance image acquisition apparatus further comprises a drive mode selection unit which manually selects one drive mode out of the two or more drive modes, and the drive mode setting unit sets a drive mode selected by the drive mode selection unit. A user can determine whether or not an imaging environment is an imaging environment in which there is the influence of ambient light and/or whether or not an imaging environment is an imaging environment in which there is the influence of the reflectance of the subject. Therefore, it is preferable that the user manually selects one drive mode out of the two or more drive modes with the drive mode selection unit.

According to still another aspect of the invention there is provided a distance image acquisition method for a distance image acquisition apparatus, which comprises a distance image sensor in which a plurality of light receiving elements are arranged in a two-dimensional manner, a pulse light emission unit which irradiates a subject within a distance measurement region with pulse light, and an imaging lens which images reflected light of the pulse light irradiated from at least the pulse light emission unit and reflected from the subject on the distance image sensor. The distance image acquisition method comprises a drive mode setting step of providing two or more drive modes among a first drive mode, in which first exposure control, second exposure control, and third exposure control are performed, in the first exposure control, pulse light being emitted from the pulse light emission unit and a difference in exposure between the corresponding light receiving elements of the distance image sensor being generated according to at least a distance of the subject, in the second exposure control, pulse light being emitted from the pulse light emission unit and a phase of exposure start with respect to the pulse light being made different from a phase of exposure start with respect to the pulse light of the first exposure control, and in the third exposure control, exposure to reflected light from the subject being performed without emitting pulse light from the pulse light emission unit, a second drive mode, in which the first exposure control and the second exposure control are performed, a third drive mode, in which the first exposure control and the third exposure control are performed, and a fourth drive mode, in which the first exposure control is performed, and setting one drive mode out of the two or more drive modes, an exposure control step of controlling exposure in the distance image sensor according to a drive mode set in the drive mode setting step, and a distance image generation step of generating a distance image corresponding to the distance of the subject within the distance measurement region based on an output of the distance image sensor subjected to exposure control in the exposure control step.

According to still another aspect of the invention, in the distance image acquisition method, it is preferable that the second exposure control is exposure control in which pulse light is emitted from the pulse light emission unit, exposure starts simultaneously with the emission of the pulse light, and all of the light receiving elements of the distance image sensor are entirely exposed to the pulse light reflected from the subject, and in a case where the first drive mode is set in the drive mode setting step, in the exposure control step, the first exposure control, the second exposure control, and the third exposure control are performed, and in the distance image generation step, first data, second data, and third data acquired from the distance image sensor by the first exposure control, the second exposure control, and the third exposure control, respectively, are used, first subtraction data is calculated by subtracting the third data corresponding to the same exposure time as an exposure time by the first exposure control from the first data, second subtraction data is calculated by subtracting the third data corresponding to the same exposure time as the exposure time by the first exposure control from the second data, and the distance image is generated based on division data obtained by dividing the first subtraction data by the second subtraction data.

According to still another aspect of the invention, in the distance image acquisition method, it is preferable that the second exposure control is exposure control in which pulse light is emitted from the pulse light emission unit, an exposure period is set not to overlap an exposure period by the first exposure control, an exposure time is set to be continuous to an exposure time by the first exposure control, and in a case of totaling an output obtained from the distance image sensor by the first exposure control and an output obtained from the distance image sensor by the second exposure control, an output with entirely exposed to the pulse light reflected from the subject is obtained, and in a case where the first drive mode is set in the drive mode setting step, in the exposure control step, the first exposure control, the second exposure control, and the third exposure control are performed, and in the distance image generation step, first data, second data, and third data acquired from the distance image sensor by the first exposure control, the second exposure control, and the third exposure control, respectively, are used, first subtraction data is calculated by subtracting the third data corresponding to the same exposure time as the exposure time of the first exposure control from the first data, second subtraction data is calculated by subtracting the third data corresponding to a total exposure time of the exposure time by the first exposure control and the exposure time by the second exposure control from addition data obtained by adding the first data and the second data, and the distance image is generated based on division data obtained by dividing the first subtraction data by the second subtraction data.

According to still another aspect of the invention, in the distance image acquisition method, it is preferable that the second exposure control is exposure control in which pulse light is emitted from the pulse light emission unit, exposure starts simultaneously with the emission of the pulse light, and all of the light receiving elements of the distance image sensor are entirely exposed to the pulse light reflected from the subject, and in a case where the second drive mode is set in the drive mode setting step, in the exposure control step, the first exposure control and the second exposure control are performed, and in the distance image generation step, first data and second data acquired from the distance image sensor by the first exposure control and the second exposure control, respectively, are used and the distance image is generated based on division data obtained by dividing the first data by the second data.

According to still another aspect of the invention, in the distance image acquisition method, it is preferable that the second exposure control is exposure control in which pulse light is emitted from the pulse light emission unit, an exposure period is set not to overlap an exposure period by the first exposure control, an exposure time is set to be continuous to an exposure time by the first exposure control, and in a case of totaling an output obtained from the distance image sensor by the first exposure control and an output obtained from the distance image sensor by the second exposure control, an output with entirely exposed to the pulse light reflected from the subject is obtained, and in a case where the second drive mode is set in the drive mode setting step, in the exposure control step, the first exposure control and the second exposure control are performed, and in the distance image generation step, first data and second data acquired from the distance image sensor by the first exposure control and the second exposure control, respectively, are used and the distance image is generated based on division data obtained by dividing the first data by addition data obtained by adding the first data and the second data.

According to still another aspect of the invention, in the distance image acquisition method, it is preferable that, in a case where the third drive mode is set in the drive mode setting step, in the exposure control step, the first exposure control and the third exposure control are performed, and in the distance image generation step, first data and third data acquired from the distance image sensor by the first exposure control and the third exposure control, respectively, are used and the distance image is generated based on subtraction data obtained by subtracting the third data corresponding to the same exposure time as an exposure time by the first exposure control from the first data.

According to still another aspect of the invention, in the distance image acquisition method, it is preferable that, in a case where the fourth drive mode is set in the drive mode setting step, in the exposure control step, the first exposure control is performed, and in the distance image generation step, the distance image is generated based on first data acquired from the distance image sensor by the first exposure control.

According to the invention, since exposure control and calculation processing are performed in a drive mode set according to the presence or absence of the influence of ambient light and/or the presence or absence of the influence of the reflectance of the subject from among a plurality of drive modes having different number of times of imaging or different exposure contents, it is possible to increase distance measurement accuracy and to omit wasteful imaging or calculation.

BRIEF DESCRIPTION OF THE DRAWINGS

FIG. 1 is a block diagram showing a functional configuration example of a distance image acquisition apparatus according to the invention.

FIGS. 4A to 4D are diagrams showing exposure control and calculation processing of a first drive mode in a pulse light detection system of a first embodiment.

FIGS. 5A to 5C are diagrams showing exposure control and calculation processing of a second drive mode in the pulse light detection system of the first embodiment.

FIGS. 8A to 8D are diagrams showing exposure control and calculation processing of a first drive mode in a pulse light detection system of a second embodiment.

FIGS. 9A to 9C are diagrams showing exposure control and calculation processing of a second drive mode in the pulse light detection system of the second embodiment.

FIG. 10 is a flowchart illustrating a drive mode setting step.

DESCRIPTION OF THE PREFERRED EMBODIMENTS

Figure 2A:
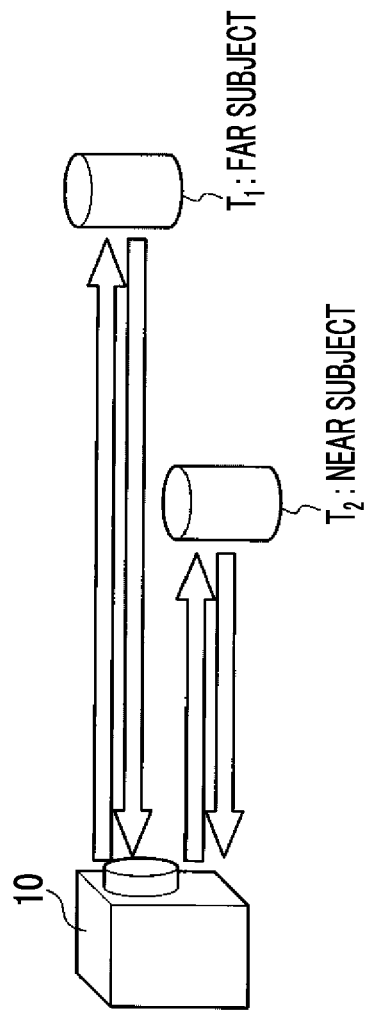
FIGS. 2A and 2B are diagrams illustrating the basic principle of a pulse light detection system.

Hereinafter, an embodiment of a distance image acquisition apparatus and a distance image acquisition method according to the invention will be described referring to the accompanying drawings.

[Distance Image Acquisition Apparatus]

FIG. 1 is a block diagram showing a functional configuration example of a distance image acquisition apparatus 10 according to the invention.

The distance image acquisition apparatus 10 shown in FIG. 1 is a distance image acquisition apparatus of a pulse light detection system, and primarily includes an imaging lens 12, a distance image sensor 14, an analog-to-digital (AD) converter 16, an interface circuit 18, a central processing unit (CPU) 20, a pulse light emission unit 22, an exposure control unit 24, and a drive mode selection unit 26.

The pulse light emission unit 22 comprises a near infrared light emitting diode (near infrared LED), and emits pulse light having a given pulse width in synchronization with a light emission timing signal from the exposure control unit 24. Pulse light emitted from the near infrared LED of the pulse light emission unit 22 is near infrared light.

The imaging lens 12 images reflected light (including reflected light of pulse light irradiated from the pulse light emission unit 22 and reflected from a subject) from the subject on the distance image sensor 14.

The distance image sensor 14 is constituted of a complementary metal-oxide semiconductor (CMOS) driver which has a vertical driver, a horizontal driver, and the like, and a CMOS type image sensor which is driven by a timing generator. The distance image sensor 14 is not limited to a CMOS type, and may be an XY address type or charge coupled device (CCD) type image sensor.

The distance image sensor 14 has a plurality of light receiving elements (photodiodes) in a two-dimensional manner, and is provided with, on an incidence surface of a plurality of light receiving elements, a band-pass filter which transmits only a wavelength bandwidth of near infrared pulse light emitted from the pulse light emission unit 22 or a visible light cut filter which eliminates visible light. With this, a plurality of light receiving elements of the distance image sensor 14 function as pixels having sensitivity to near infrared light.

The distance image sensor 14 is configured such that an exposure period (exposure time and exposure timing) is controlled according to a shutter control signal applied from the exposure control unit 24, and electric charge corresponding to the amount of near infrared light entering in the exposure period is accumulated in each light receiving element of the distance image sensor 14. Then, a pixel signal (an analog signal corresponding to electric charge accumulated in each pixel) according to the amount of incidence of near infrared light from the subject is read from the distance image sensor 14.

Though details will be described below, the exposure control unit 24 performs one exposure control among first exposure control, in which pulse light is emitted from the pulse light emission unit 22, and the difference in the exposure (light reception time of pulse light) between the corresponding light receiving elements of the distance image sensor 14 according to at least a distance of the subject, second exposure control, in which pulse light is emitted from the pulse light emission unit 22, a phase of exposure start with respect to pulse light is different from a phase of exposure start with respect to pulse light of the first exposure control, and all of the light receiving elements of the distance image sensor 14 are entirely exposed to pulse light reflected from the subject, and a third exposure control, in which light is not emitted from the pulse light emission unit 22 and exposure to reflected light from the subject is performed, sequentially or selectively.

The analog signal read from the distance image sensor 14 after the exposure control in the exposure control unit 24 is converted to a digital signal by the AD converter 16, and is loaded on the CPU 20 by way of the interface circuit 18 functioning as an image input controller. A CMOS type image sensor may include an AD converter, and in this case, the AD converter 16 may be omitted.

Though details will be described below, the CPU 20 has a function as a device control unit which integrally controls the respective units, such as the exposure control unit 24, of the distance image acquisition apparatus 10, and a function as a drive mode setting unit 20A, a distance image generation unit 20B, a brightness detection unit 20C, and a determination unit 20D.

<Basic Principle of Pulse Light Detection System>

Next, the basic principle of the pulse light detection system applied to the invention will be described.

Pulse light irradiated from the pulse light emission unit 22 of the distance image acquisition apparatus 10 enters a subject within a distance measurement region, and pulse light reflected from the subject is imaged (received) by the distance image sensor 14 through the imaging lens 12.

As shown in FIG. 2A, in a case where there are a far subject $T_1$ and a near subject $T_2$ within the distance measurement region, pulse light indicated by an arrow is returned earlier from the near subject $T_2$ than from the far subject $T_1$, and is received by the distance image sensor 14.

Figure 2B:
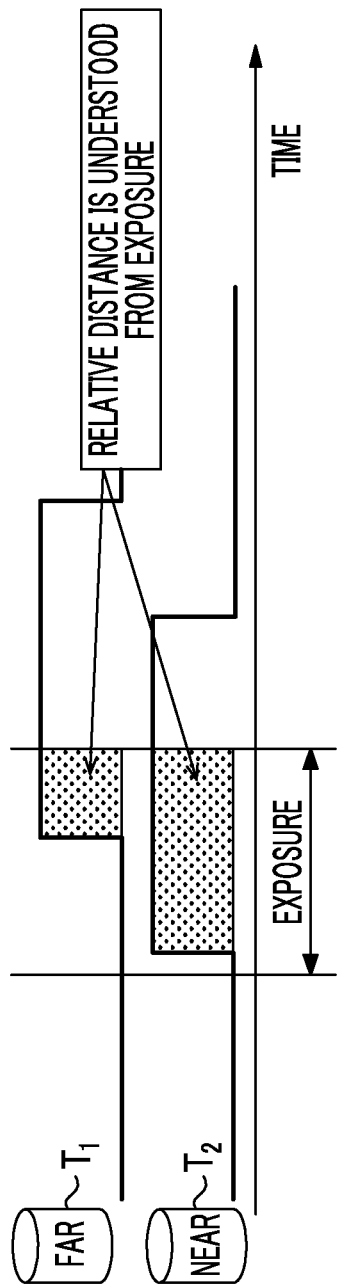

FIG. 2B is a diagram showing the relationship of pulse light reflected from the far subject $T_1$ and the near subject $T_2$ and received by the distance image sensor 14 and the exposure period, and in particular, shows a case where the far subject $T_1$ and the near subject $T_2$ have the same reflectance.

In this case, as shown in FIG. 2A, in a case where exposure control in which exposure starts in synchronization with the light emission timing of the pulse light and exposure ends when an appropriate time elapses after reflected light is received simultaneously from the far subject $T_1$ and the near subject $T_2$, the exposure becomes larger for the near subject $T_2$ than for the far subject $T_1$.

Therefore, in a case where the subjects have the same reflectance, it is possible to measure a relative distance according to the magnitude of the exposure.

Figure 3A:
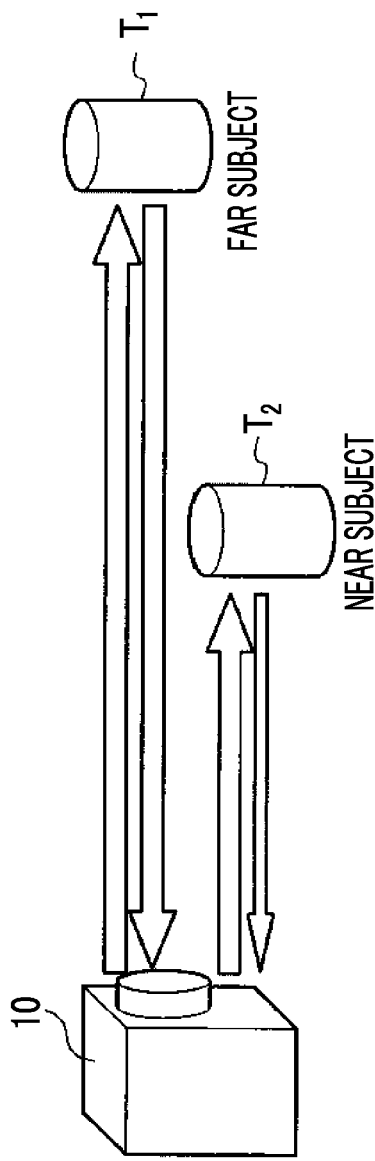
FIGS. 3A and 3B are diagrams illustrating when a distance image cannot be measured with single imaging due to the influence of reflectance of a subject in a case of the pulse light detection system.

A near subject $T_2$ shown in FIG. 3A has reflectance lower than that of a far subject $T_1$, and the amount of pulse light reflected and returned from the near subject $T_2$ is smaller than the amount of pulse light reflected and returned from the far subject $T_1$. In FIG. 3A, the thickness of an arrow represents the amount of pulse light.

Figure 3B:
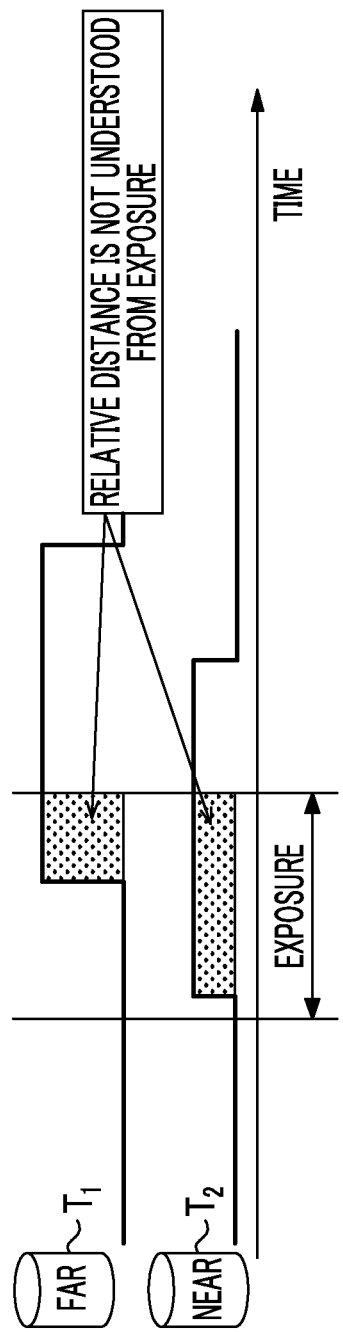

In this case, as shown in FIG. 3B, even if exposure control is performed in the same manner as in FIG. 2B, it is not possible to measure the relative distance of the subject from the exposure obtained by the exposure control.

Therefore, in a case where the reflectance of the subject is not constant, it is necessary to perform multiple times of exposure control in order to eliminate the influence of the reflectance.

In a case where there is near infrared ambient light other than near infrared pulse light (for example, in an imaging environment, such as the outdoors in the daytime), since distance measurement accuracy is deteriorated due to the influence of ambient light, it is preferable to eliminate the influence of ambient light. In this case, the difference in the exposure between exposure control in which pulse light is irradiated and exposure control in which pulse light is not irradiated is taken, whereby it is possible to eliminate the influence of ambient light.

[Drive Mode]

Hereinafter, a drive mode in a pulse light detection system of a first embodiment will be described.

<First Drive Mode>

FIGS. 4A to 4D are diagrams showing exposure control and calculation processing of a first drive mode in the pulse light detection system of the first embodiment.

The first drive mode is a mode which is set in a case of an imaging environment, in which there is the influence of ambient light and the reflectance of the subject.

In the first drive mode, as shown in FIGS. 4A, 4B, and 4C, three times of exposure control of the first exposure control, the second exposure control, and the third exposure control are performed.

The first exposure control shown in FIG. 4A is exposure control in which pulse light is emitted from the pulse light emission unit 22, and the exposure period is controlled such that the difference in the exposure between the corresponding light receiving elements of the distance image sensor 14 is generated according to at least the distance of the subject. In the first exposure control, exposure starts when a given time (a time until pulse light is returned from the farthest subject capable of distance measurement) elapses after pulse light is emitted from the pulse light emission unit 22, and exposure ends when a time (predetermined exposure time) until pulse light reflected from at least the farthest subject is entirely returned elapses.

According to the above-described first exposure control, in a case where the reflectance of the subject is constant, in comparison of the far subject $T_1$ and the near subject $T_2$, the exposure becomes larger for the far subject $T_1$ than for the near subject $T_2$.

The second exposure control shown in FIG. 4B is exposure control in which pulse light is emitted from the pulse light emission unit 22 and a phase of exposure start with respect to pulse light is different from a phase of exposure start with respect to pulse light of the first exposure control, and is exposure control for eliminating change in the exposure in the distance image sensor 14 due to the difference in the reflectance of the subject. In this example, the second exposure control is exposure control in which all of the light receiving elements of the distance image sensor 14 are entirely exposed to pulse light reflected from the subject. Specifically, exposure starts in synchronization with the light emission timing of pulse light emitted from the pulse light emission unit 22, and exposure ends when a given time (a predetermined exposure time until pulse light is entirely returned from at least the farthest subject capable of distance measurement) elapses. While the "predetermined exposure time" in the first exposure control is the same time as the "predetermined exposure time" in the second exposure control, as described above, the phase of exposure start with respect to pulse light is different.

According to the above-described second exposure control, the exposure is different according to the reflectance of the subject regardless of whether the subject is far or near, and it is possible to acquire information corresponding to the reflectance of the subject with the exposure obtained by the first exposure control.

The third exposure control shown in FIG. 4C is exposure control in which pulse light is not emitted from the pulse light emission unit 22 and exposure to reflected light from the subject is performed. In comparison with the second exposure control, the third exposure control is different from the second exposure control in that, while pulse light is emitted (irradiated) and the exposure control is performed in the second exposure control, exposure control is performed without emitting pulse light (in a non-irradiation manner) in the third exposure control.

According to the above-described third exposure control, it is possible to acquire the exposure of only ambient light.

As shown in FIG. 4D, in a case where output data corresponding to the exposures acquired from the distance image sensor 14 by the first exposure control, the second exposure control, and the third exposure control are defined as first data $L_1$, second data $L_2$, the third data $L_3$, respectively, information (hereinafter, referred to as "distance information") D corresponding to the relative distance of the subject can be calculated by the following expression.

$$D=(L_1-L_3)\div(L_2-L_3) \quad [1]$$

That is, according to Expression [1], first subtraction data $(L_1-L_3)$ is calculated by subtracting the third data $L_3$ from the first data $L_1$, and second subtraction data $(L_2-L_3)$ is calculated by subtracting the third data $L_3$ from the second data $L_2$. The first subtraction data is data including the distance and reflectance of the subject with the influence of ambient light eliminated, and the second subtraction data is data indicating the reflectance of the subject with the influence of ambient light eliminated. Then, division data is calculated by dividing the first subtraction data by the second subtraction data. The division data becomes data (distance information D) corresponding to the distance (relative distance) of the subject with the influence of ambient light and the influence of the reflectance of the subject eliminated.

Since the relative distance calculated for each light receiving element of the distance image sensor 14 in the above-described manner is based on a polar coordinate system, the relative distance is converted to an orthogonal coordinate system, whereby it is possible to generate a distance image corresponding to the distance (relative distance) of the subject within the distance measurement region.

The distance information D corresponding to the relative distance of the subject calculated in this manner has the influence of ambient light and the influence of the reflectance of the subject eliminated.

While the "distance image" refers to an image having the distance from the imaging unit to the subject instead of a color or the value of shade of a normal two-dimensional image, an image having the relative distance (distance information D) of the subject calculated based on Expression [1] described above is also an aspect of a "distance image" in the invention.

According to Expression [1] described above, while the distance information D corresponding to the relative distance of the subject with the influence of ambient light and the influence of the reflectance of the subject eliminated is calculated, the invention is not limited thereto, and an absolute distance of the subject with the influence of ambient light and the influence of the reflectance of the subject eliminated can be calculated based on the first data $L_1$, the second data $L_2$, and the third data $L_3$ acquired by the first drive mode using a known method, and obtaining the absolute distance of the subject is an aspect of generating a "distance image" in the invention.

<Second Drive Mode>

FIGS. 5A to 5C are diagrams showing exposure control and calculation processing of a second drive mode in the pulse light detection system of the first embodiment.

The second drive mode is a mode which is set in a case of an imaging environment, in which there is no influence of ambient light and there is the influence of the reflectance of the subject.

In the second drive mode, as shown in FIGS. 5A and 5B, two times of exposure control of the first exposure control and the second exposure control are performed. The first exposure control and the second exposure control shown in FIGS. 5A and 5B are the same as the first exposure control and the second exposure control in the first drive mode shown in FIGS. 4A and 4B, and thus, detailed description thereof will not be repeated.

As shown in FIG. 5C, in a case where output data corresponding to the exposures acquired from the distance image sensor 14 by the first exposure control and the second exposure control are defined as the first data $L_1$ and the second data $L_2$, respectively, the distance information D corresponding to the relative distance of the subject can be calculated by the following expression.

$$D=L_1 \div L_2 \qquad [2]$$

That is, according to Expression [2], division data is calculated by dividing the first data $L_1$ by the second data $L_2$. The division data becomes data (distance information D) corresponding to the relative distance with the influence of the reflectance of the subject eliminated. The absolute distance of the subject may be obtained based on the first data $L_1$ corresponding to the distance and reflectance of the subject with no influence of ambient light and the second data $L_2$ corresponding to the reflectance of the subject with no influence of ambient light.

<Third Drive Mode>

Figure 6A:
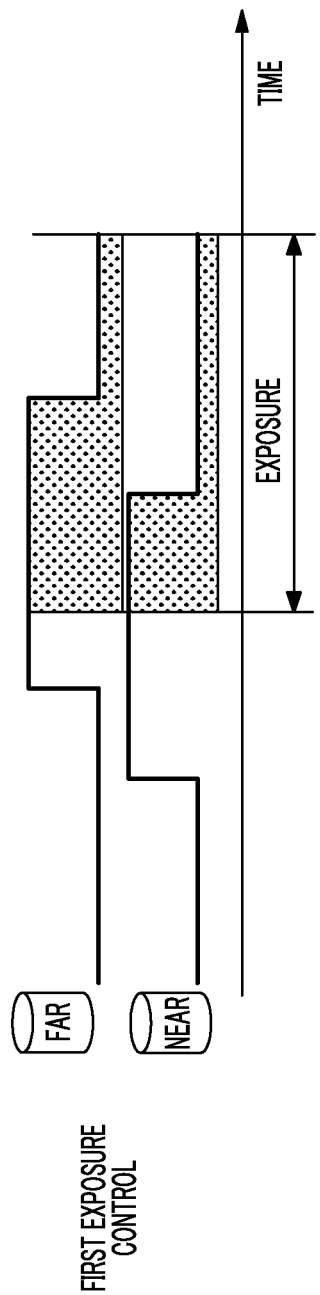
FIGS. 6A to 6C are diagrams showing exposure control and calculation processing of a third drive mode in the pulse light detection system of the first embodiment.
Figure 6B:
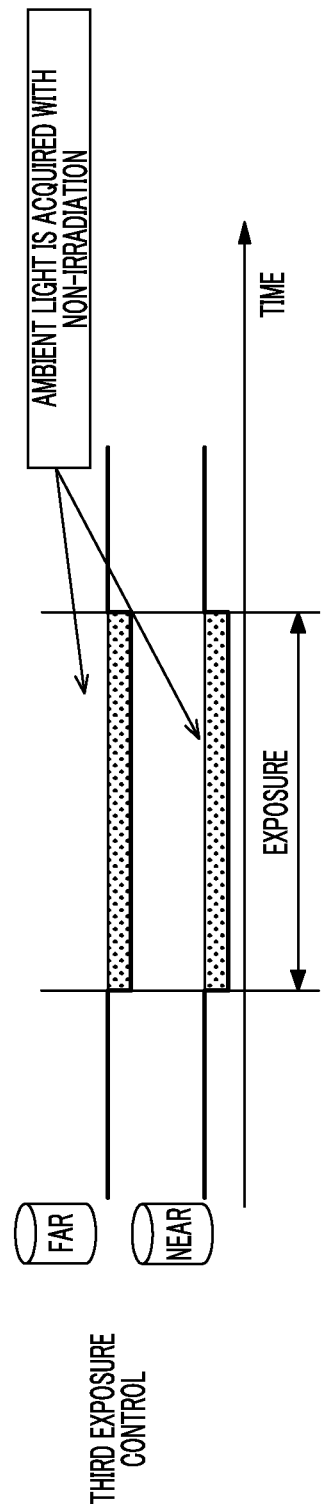
Figure 6C:
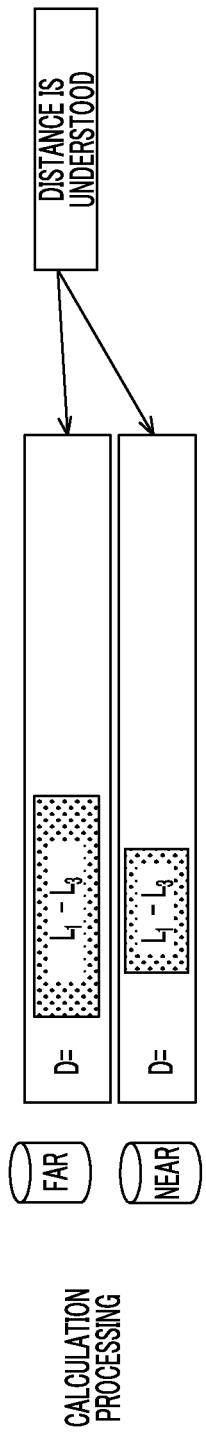

FIGS. 6A to 6C are diagrams of exposure control and calculation processing of a third drive mode in the pulse light detection system of the first embodiment.

The third drive mode is a mode which is set in a case of an imaging environment, in which the reflectance of the subject is constant (there is no influence of reflectance) and there is the influence of ambient light. The expression "reflectance is constant" refers to, for example, a case where reflectance between subjects (as shown in FIG. 2A, the far subject $T_1$ and the near subject $T_2$) within a distance measurement region to be imaged is constant, a case where reflectance of a distance measurement target (including a tracking target in a case of imaging while tracking a specific subject) is constant temporally, or the like.

In the third drive mode, as shown in FIGS. 6A and 6B, two times of exposure control of the first exposure control and the third exposure control are performed. The first exposure control and the third exposure control shown in FIGS. 6A and 6B are the same as the first exposure control and the third exposure control in the first drive mode shown in FIGS. 4A and 4C, and thus, detailed description thereof will not be repeated.

As shown in FIG. 6C, in a case where output data corresponding to the exposures acquired from the distance image sensor 14 by the first exposure control and the third exposure control are defined as the first data $L_1$ and the third data $L_3$, respectively, the distance information D corresponding to the relative distance of the subject can be calculated by the following expression.

$$D=L_1-L_3 \qquad [3]$$

That is, according to Expression [3], subtraction data is calculated by subtracting the third data $L_3$ from the first data $L_1$. The subtraction data becomes data (distance information D) corresponding to the relative distance with the influence of ambient light eliminated. As long as information is information of the reflectance of the subject having constant reflectance, the absolute distance of the subject may be obtained based on the first data $L_1$ and the third data $L_3$.

<Fourth Drive Mode>

Figure 7A:
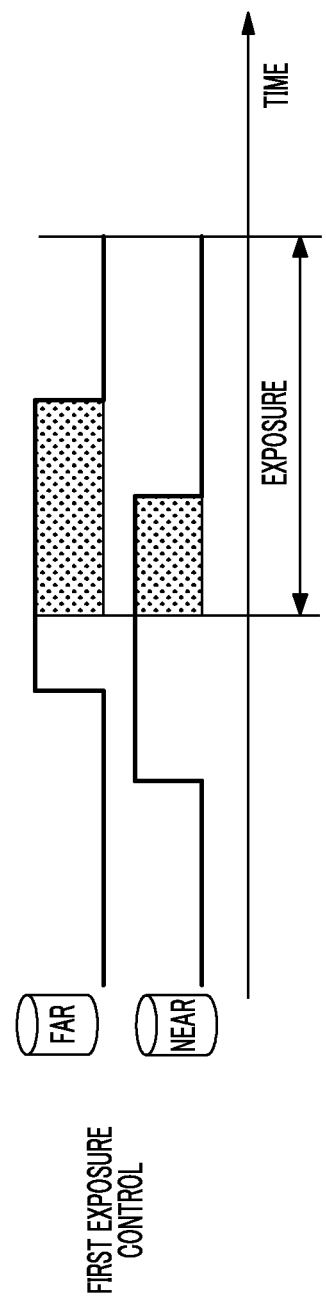
FIGS. 7A and 7B are diagrams showing an embodiment of exposure control and calculation processing of a fourth drive mode in the pulse light detection system of the first embodiment.
Figure 7B:
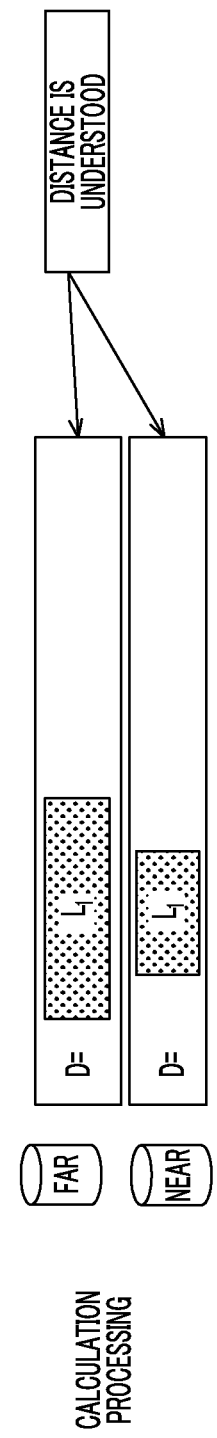

FIGS. 7A and 7B are diagrams showing an embodiment of exposure control and calculation processing of a fourth drive mode in the pulse light detection system of the first embodiment.

The fourth drive mode is a mode which is set in an imaging environment, in which there is no influence of ambient light and the reflectance of the subject is constant (there is no influence of reflectance).

In the fourth drive mode, as shown in FIG. 7A, only single exposure control of the first exposure control is performed. The first exposure control shown in FIG. 7A is the same as the first exposure control in the first drive mode shown in FIG. 4A, and thus, detailed description will not be repeated.

As shown in FIG. 7B, in a case where output data corresponding to the exposure acquired from the distance image sensor 14 by the first exposure control is defined as the first data $L_1$, the first data $L_1$ becomes the distance information D ($=L_1$) corresponding to the relative distance of the subject.

The distance information D corresponding to the relative distance of the subject obtained in this manner has no influence of ambient light and the reflectance of the subject as will be apparent from an imaging condition, to which the fourth drive mode is applied. As long as information is information of the reflectance of the subject having constant reflectance, the absolute distance of the subject can be obtained.

Next, a drive mode in a pulse light detection system of a second embodiment will be described.

As described below in detail, the pulse light detection system of the second embodiment is different from the pulse light detection system of the first embodiment in terms of exposure control and calculation processing in the first drive mode and the second drive mode.

<First Drive Mode>

FIGS. 8A to 8D are diagrams showing exposure control and calculation processing of a first drive mode in the pulse light detection system of the second embodiment.

The first drive mode is a mode which is set in a case of an imaging environment, in which there is the influence of ambient light and the reflectance of the subject.

Figure 8C:
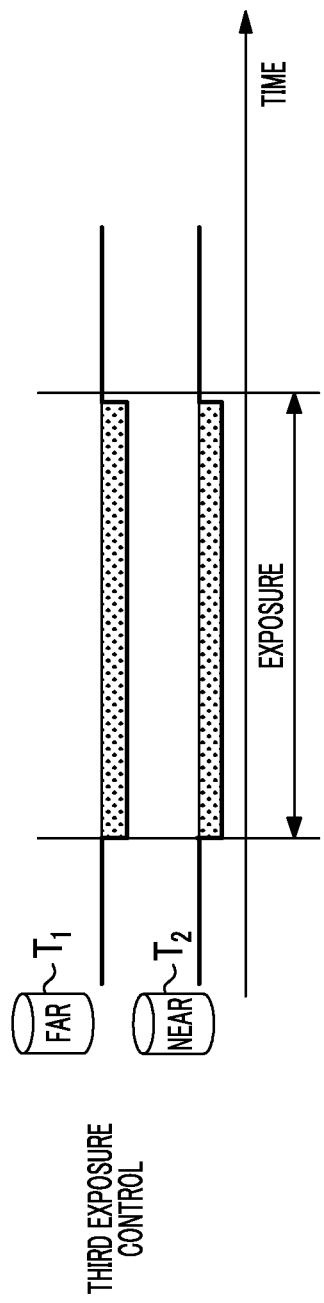

In the first drive mode, as shown in FIGS. 8A, 8B, and 8C, the first exposure control, the second exposure control, and the third exposure control are performed.

The first exposure control shown in FIG. 8A is exposure control in which pulse light is emitted from the pulse light emission unit 22, and the exposure period is controlled such that the difference in the exposure between the corresponding light receiving elements of the distance image sensor 14 is generated according to at least the distance of the subject, and corresponds to the first exposure control of the first drive mode in the pulse light detection system of the first embodiment shown in FIG. 4A.

The second exposure control shown in FIG. 8B is exposure control in which pulse light is emitted from the pulse light emission unit 22, and the phase of exposure start with respect to pulse light is different from the phase of exposure start with respect to pulse light of the first exposure control. In this example, the second exposure control is exposure control in which exposure starts in synchronization with the light emission timing of pulse light emitted from the pulse light emission unit 22, and exposure is performed for the same time as the exposure time by the first exposure control. In other words, the second exposure control is exposure control in which the exposure period is set not to overlap the exposure period by the first exposure control shown in FIG. 8A, the exposure time is continuous to the exposure time by the first exposure control, and in a case of totaling an output obtained from the distance image sensor 14 by the first exposure control and an output obtained from the distance image sensor 14 by the second exposure control, an output with entirely exposed to pulse light reflected from the subject is obtained.

Specifically, the second exposure control is exposure control in which exposure starts in synchronization with the light emission timing of pulse light emitted from the pulse light emission unit 22, and exposure ends in synchronization with the lapse of a time corresponding to a half width of the light emission time of pulse light.

It is preferable that a plurality of light receiving elements of the distance image sensor 14 arranged in a two-dimensional manner are divided into a first light receiving element group for first exposure control and a second light receiving element group for second exposure control, exposure control for the first light receiving element group is performed by the first exposure control, and exposure control for the second light receiving element group is performed by the second exposure control. It is preferable that the first light receiving element group and the second light receiving element group are arranged in a checkered flag pattern.

The third exposure control shown in FIG. 8C is exposure control in which exposure to reflected light from the subject is performed without emitting pulse light from the pulse light emission unit 22. In this example, exposure control is performed for an exposure time (the exposure time by the first exposure control, or an exposure time twice longer than the exposure time by the second exposure control) obtained by totaling the exposure time by the first exposure control and the exposure time by the second exposure control.

Figure 8D:
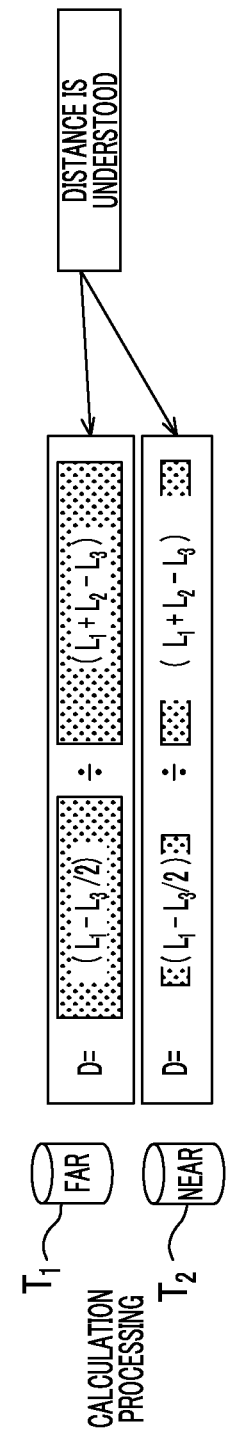

As shown in FIG. 8D, in a case where output data corresponding to the exposures acquired from the distance image sensor 14 by the first exposure control, the second exposure control, and the third exposure control are defined as the first data $L_1$, the second data $L_2$, and the third data $L_3$, respectively, the distance information D corresponding to the relative distance of the subject is calculated by the following expression.

$$D=(L_1-L_3/2) \div (L_1+L_2-L_3) \quad [4]$$

That is, according to Expression [4], first subtraction data $(L_1-L_3/2)$ is calculated by subtracting half (since the exposure time is twice) of the third data $L_3$ from the first data $L_1$, and second subtraction data $(L_1+L_2-L_3)$ is calculated by adding the first data $L_1$ and the second data $L_2$ and subtracting the third data $L_3$ from the addition data. The first subtraction data is data including the distance and reflectance of the subject with the influence of ambient light eliminated, and the second subtraction data is data indicating the reflectance of the subject with the influence of ambient light eliminated. Then, division data is calculated by dividing the first subtraction data by the second subtraction data. The division data becomes data (distance information D) corresponding to the relative distance with the influence of ambient light and the influence of the reflectance of the subject eliminated.

The exposure time by the third exposure control shown in FIG. 8C can be set to a half exposure time (the same exposure time as the exposure time by the first exposure control or the exposure time by the second exposure control), and in this case, the following expression is used instead of Expression [4] described above.

$$D=(L_1-L_3) \div (L_1+L_2-2L_3) \quad [5]$$

<Second Drive Mode>

FIGS. 9A to 9C are diagrams showing exposure control and calculation processing of a second drive mode in the pulse light detection system of the second embodiment.

The second drive mode is a mode which is set in a case of an imaging environment, in which there is no influence of ambient light and there is the influence of the reflectance of the subject.

In the second drive mode, as shown in FIGS. 9A and 9B, the first exposure control and the second exposure control are performed. The first exposure control and the second exposure control shown in FIGS. 9A and 9B are the same as the first exposure control and the second exposure control in the first drive mode shown in FIGS. 8A and 8B, and thus, detailed description thereof will not be repeated.

As shown in FIG. 9C, in a case where output data corresponding to the exposures acquired from the distance image sensor 14 by the first exposure control and the second exposure control are defined as the first data $L_1$ and the second data $L_2$, respectively, the distance information D corresponding to the relative distance of the subject is calculated by the following expression.

$$D=L_1 \div (L_1+L_2) \quad [6]$$

That is, according to Expression [6], division data is calculated by dividing the first data $L_1$ with no influence of ambient light by addition data $(L_1+L_2)$ (data indicating the reflectance of the subject with no influence of ambient light) obtained by adding the first data $L_1$ and the second data $L_2$. The division data becomes data (distance information D) corresponding to the relative distance with the influence of the reflectance of the subject eliminated.

Returning to FIG. 1, the drive mode setting unit 20A in the CPU 20 is a part which sets one drive mode among the first drive mode to the fourth drive mode described above, and sets a drive mode automatically according to an imaging environment or sets a drive mode selected by a user's manual operation on the drive mode selection unit 26.

The brightness detection unit 20C is a part which detects brightness of ambient light, and outputs an integrated average value of a sensor output from the distance image sensor 14 at the time of performing exposure control (exposure control corresponding to the third exposure control shown in FIG. 4C) without emitting pulse light from the pulse light emission unit 22 as information indicating the brightness of ambient light to the drive mode setting unit 20A. For example, in a case of an imaging environment, such as the nighttime, the brightness of ambient light detected by the brightness detection unit 20C becomes equal to or less than a threshold corresponding to measurement accuracy. In a case of an imaging environment, such as the indoors with only an artificial light source, since near infrared light is not included in the artificial light source, the brightness of ambient light detected by the brightness detection unit 20C becomes equal to or less than the threshold set corresponding to the measurement accuracy. In the first exposure control and the second exposure control, in a case where exposure to ambient light other than pulse light is performed, the distance measurement accuracy is degraded. The threshold is a value which is set corresponding to required measurement accuracy, and needs to be set to a threshold closer to 0 when the measurement accuracy is higher.

The determination unit 20D is a part which determines whether or not reflectance of a subject for distance measurement is constant, and for example, in a case where the distance image acquisition apparatus 10 is used for the purpose of tracking a specific subject (a part of a machine tool, a face of a person, or the like) and measuring a distance of the subject, determines that the reflectance of the subject is constant. A determination result determined by the determination unit 20D is output to the drive mode setting unit 20A.

In a case where an automatic mode is selected by the drive mode selection unit 26, and a drive mode is set automatically, the drive mode setting unit 20A sets an optimum drive mode among the first drive mode to the fourth drive mode based on information indicating the brightness of ambient light input from the brightness detection unit 20C and determination information input from the determination unit 20D regarding whether or not the reflectance of the subject is constant.

That is, the drive mode setting unit 20A determines that the brightness of ambient light is greater than the threshold (there is the influence of ambient light) based on information indicating the brightness of ambient light input from the brightness detection unit 20C and the determination information input from the determination unit 20D, and in a case where it is determined that the reflectance of the subject is not constant, sets the first drive mode shown in FIGS. 4A to 4D or FIGS. 8A to 8D.

Similarly, the drive mode setting unit 20A determines that the brightness of ambient light is equal to or less than the threshold (there is no influence of ambient light), in a case where it is determined that the reflectance of the subject is constant, sets the second drive mode shown in FIGS. 5A to 5C or FIGS. 9A to 9C, in a case where it is determined that the brightness of ambient light is greater than the threshold and it is determined that the reflectance of the subject is constant, sets the third drive mode shown in FIGS. 6A to 6C, and in a case where it is determined that the brightness of ambient light is equal to or less than the threshold and it is determined that the reflectance of the subject is constant, sets the fourth drive mode shown in FIGS. 7A and 7B.

In a case where a manual mode is selected by the drive mode selection unit 26 and one drive mode among the first drive mode to the fourth drive mode is selected by a manual operation, the drive mode setting unit 20A sets the manually selected drive mode.

In a case where one drive mode among the first drive mode to the fourth drive mode is set by the drive mode setting unit 20A, information indicating the set drive mode is applied to the exposure control unit 24.

As described referring to FIGS. 4A to 4D to FIGS. 9A to 9C, the exposure control unit 24 performs light emission control of pulse light of the pulse light emission unit 22 and exposure control (exposure control including the first exposure control among the first exposure control, the second exposure control, and the third exposure control) of the distance image sensor 14 according to the input drive mode.

The distance image generation unit 20B acquires the sensor output (the first data $L_1$, the second data $L_2$, or the third data $L_3$ corresponding to the exposure of the distance image sensor 14 by the first exposure control, the second exposure control, and the third exposure control) of the distance image sensor 14 according to the exposure control by the exposure control unit 24 through the interface circuit 18. Then, in a case where the first drive mode is set, the distance (relative distance) of the subject for each light receiving element of the distance image sensor 14 is calculated based on the first data $L_1$, the second data $L_2$, and the third data $L_3$ corresponding to the exposures by the first exposure control, the second exposure control, and the third exposure control by Expression [1] or Expression [4] described above, and the distance of the subject corresponding to all of the light receiving elements is calculated, thereby generating a distance image corresponding to the relative distance of the subject within the distance measurement region.

Similarly, in a case where the second drive mode is set, the distance image generation unit 20B calculates the distance of the subject for each light receiving element of the distance image sensor 14 based on the first data $L_1$ and the second data $L_2$ corresponding to the exposures by the first exposure control and the second exposure control by Expression [2] or Expression [6] described above, and calculates the distance of the subject corresponding to all of the light receiving elements, thereby generating a distance image corresponding to the relative distance of the subject within the distance measurement region. In a case where the third drive mode is set, the distance image generation unit 20B calculates the distance of the subject for each light receiving element of the distance image sensor 14 based on the first data $L_1$ and the third data $L_3$ corresponding to the exposures by the first exposure control and the third exposure control by Expression [3] described above, and calculates the distance of the subject corresponding to all of the light receiving elements, thereby generating a distance image corresponding to the relative distance of the subject within the distance measurement region. In a case where the fourth drive mode is set, the distance image generation unit 20B calculates the distance of the subject for each light receiving element of the distance image sensor 14 based on the first data $L_1$ corresponding to the exposure by the first exposure control, and calculates the distance of the subject corresponding to all of the light receiving elements, thereby generating a distance image corresponding to the relative distance of the subject within the distance measurement region.

[Distance Image Acquisition Method]

An embodiment of an imaging processing method according to the invention provides a first drive mode to a fourth drive mode, sets one drive mode among the four drive modes, and performs exposure control and calculation processing in the set drive mode.

Drive mode setting is performed based on determination shown in a flowchart of FIG. 10 (drive mode setting step).

That is, it is determined whether or not the reflectance of the subject is constant (Step S10), in a case where the reflectance of the subject is not constant (in a case of "No"), the process transits to Step S12, and in a case where the reflectance of the subject is constant (in a case of "Yes"), the process transits to Step S14.

In Steps S12 and S14, it is determined whether or not the brightness of ambient light is equal to or less than the threshold (a threshold for determining whether or not the brightness of ambient light affects the measurement accuracy and set corresponding to the measurement accuracy), and in a case where it is determined in Steps S12 and S14 that the brightness of ambient light is equal to or less than the threshold (in a case of "Yes"), the second drive mode and the fourth drive mode are set, respectively.

In a case where it is determined in Steps S12 and S14 that the brightness of ambient light is greater than the threshold (in a case of "No"), the first drive mode and the third drive mode are set, respectively.

With this, the first drive mode is set in a case of an imaging environment in which there is the influence of ambient light and the reflectance of the subject, the second drive mode is set in a case of an imaging environment in which there is no influence of ambient light and there is the influence of the reflectance of the subject, the third drive mode is set in a case of an imaging environment in which the reflectance of the subject is constant (there is no influence of reflectance) and there is the influence of ambient light, and the fourth drive mode is set in a case of an imaging environment in which there is no influence of ambient light and the reflectance of the subject is constant (there is no influence of reflectance).

The above-described drive mode setting may be performed automatically by the drive mode setting unit 20A shown in FIG. 1 based on information indicating the brightness of ambient light input from the brightness detection unit 20C and the determination information input from the determination unit 20D indicating whether or not the reflectance of the subject is constant, or may be performed based on a user's drive mode selection operation on the drive mode selection unit 26.

Next, the distance image acquisition method in each drive mode of the first drive mode to the fourth drive mode will be described. Hereinafter, although a case of a drive mode in the pulse light detection system of the first embodiment will be described, a drive mode in the pulse light detection system of the second embodiment can be performed similarly.

Figure 11:
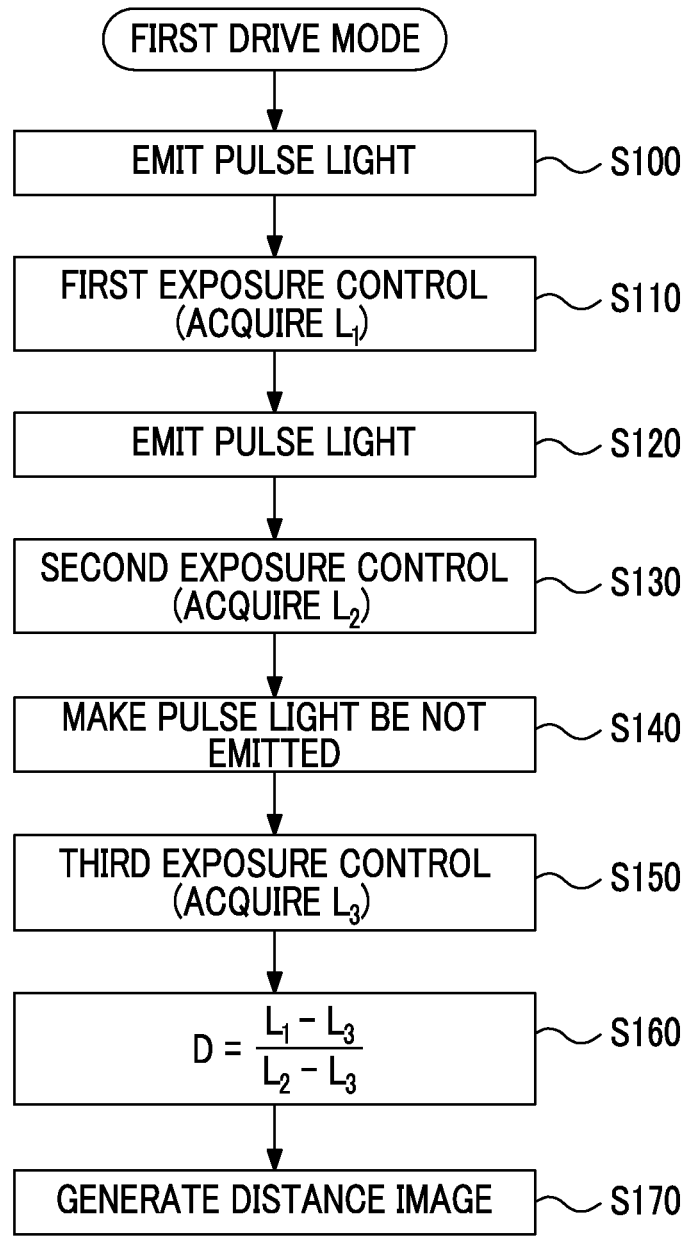
FIG. 11 is a flowchart showing a distance image acquisition method in a case where the first drive mode is set.

FIG. 11 is a flowchart showing the distance image acquisition method in a case where the first drive mode is set.

In FIG. 11, first, pulse light is emitted from the pulse light emission unit 22 (Step S100), and the first exposure control shown in FIG. 4A is performed (Step S110). The first data $L_1$ corresponding to the exposure of each light receiving element of the distance image sensor 14 by the first exposure control is acquired from the distance image sensor 14.

Subsequently, second pulse light is emitted from the pulse light emission unit 22 (Step S120), and the second exposure control shown in FIG. 4B is performed (Step S130). The second data $L_2$ corresponding to the exposure of each light receiving element of the distance image sensor 14 by the second exposure control is acquired from the distance image sensor 14.

Next, the third exposure control shown in FIG. 4C is performed without emitting pulse light from the pulse light emission unit 22 (Steps S140, S150). The third data $L_3$ corresponding to the exposure of each light receiving element of the distance image sensor 14 by the third exposure control is acquired from the distance image sensor 14. Step S100 to Step S150 correspond to an exposure control step in the first drive mode.

Next, the calculation shown in Expression [1] described above is executed based on the first data $L_1$, the second data $L_2$, and the third data $L_3$ corresponding to the exposures by the first exposure control, the second exposure control, and the third exposure control acquired in Steps S110, S130, and S150, and the distance information D corresponding to the relative distance of the subject is calculated for each light receiving element of the distance image sensor 14 (Step S160).

The distance image is generated based on the distance information D for each light receiving element of the distance image sensor 14 calculated in Step S160 (Step S170). Steps S160 and S170 correspond to a distance image generation step.

The processing of Step S100 to Step S170 may be repeatedly executed at given intervals, and accordingly, it is possible to obtain a distance image in the format of video continuous at given intervals.

Figure 12:
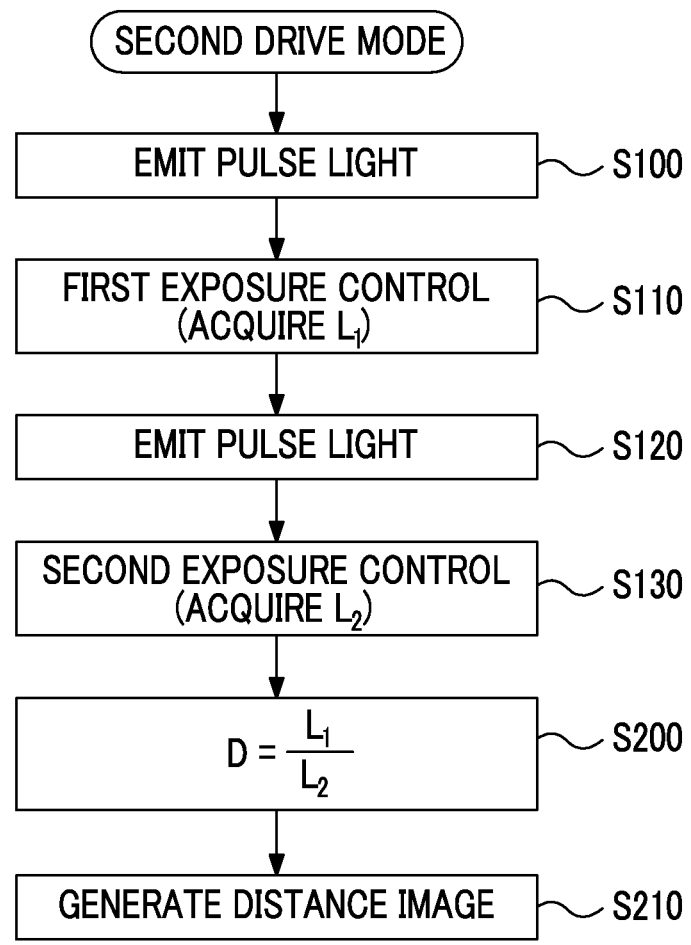
FIG. 12 is a flowchart showing the distance image acquisition method in a case where the second drive mode is set.

FIG. 12 is a flowchart showing the distance image acquisition method in a case where the second drive mode is set. The steps common to the first drive mode shown in FIG. 11 are represented by the same step numbers, and detailed description thereof will not be repeated.

An exposure control step in a case where the second drive mode is set corresponds to Step S100 to Step S130 in the first drive mode, and the processing of Step S140 and Step S150 is omitted.

Next, the calculation shown in Expression [2] described above is executed based on the first data $L_1$ and the second data $L_2$ corresponding to the exposures by the first exposure control and the second exposure control acquired in Steps S110 and S130, and the distance information D corresponding to the relative distance of the subject is calculated for each light receiving element of the distance image sensor 14 (Step S200).

The distance image is generated based on the distance information D for each light receiving element of the distance image sensor 14 calculated in Step S200 (Step S210).

Since the second drive mode which is set in a case of an imaging environment, in which there is no influence of ambient light and there is the influence of the reflectance of the subject, has a smaller number of times of imaging than in the first drive mode, and performs less calculation for calculating the distance information D, little shot noise and high distance measurement accuracy are achieved.

Figure 13:
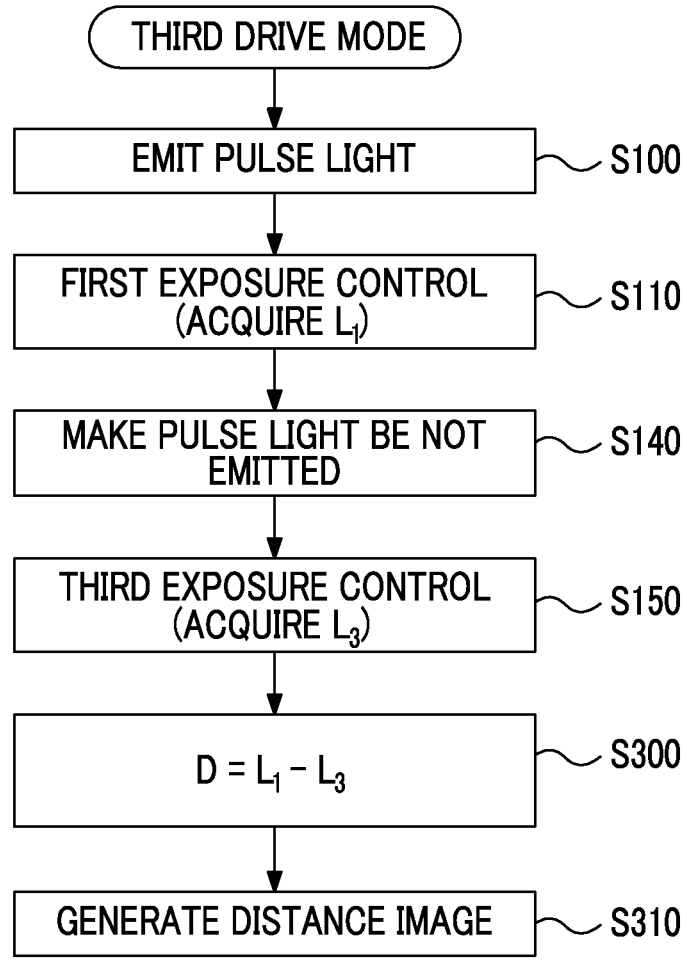
FIG. 13 is a flowchart showing the distance image acquisition method in a case where the third drive mode is set.

FIG. 13 is a flowchart showing the distance image acquisition method in a case where the third drive mode is set. The steps common to the first drive mode shown in FIG. 11 are represented by the same step numbers, and detailed description will not be repeated.

An exposure control step in a case where the third drive mode is set corresponds to Steps S100, S110, S140, and S150 in the first drive mode, and the processing of Step S120 and Step S130 is omitted.

Next, the calculation shown in Expression [3] described above is executed based on the first data $L_1$ and the third data $L_3$ corresponding to the exposures by the first exposure control and the third exposure control acquired in Steps S110 and S150, and the distance information D corresponding to the relative distance of the subject is calculated for each light receiving element of the distance image sensor 14 (Step S300).

The distance image is generated based on the distance information D for each light receiving element of the distance image sensor 14 calculated in Step S300 (Step S310).

Since the third drive mode which is set in an imaging environment, in which there is no influence of the reflectance of the subject and there is the influence of ambient light, has a smaller number of times of imaging than in the first drive mode and performs less calculation for calculating the distance information D, little shot noise and high distance measurement accuracy are achieved.

Figure 14:
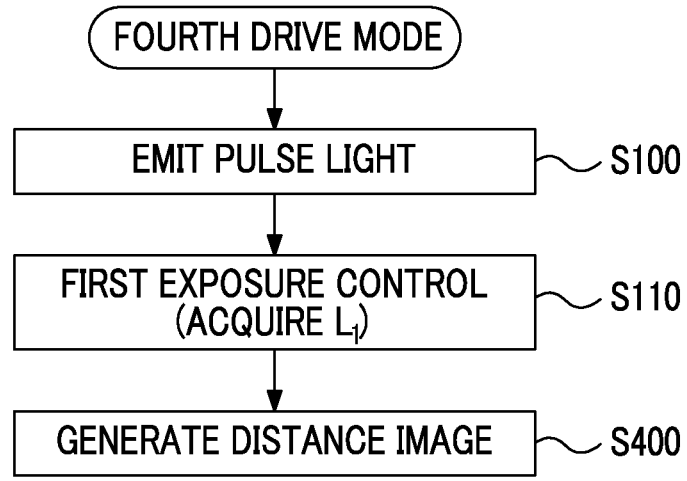
FIG. 14 is a flowchart showing the distance image acquisition method in a case where the fourth drive mode is set.

FIG. 14 is a flowchart showing the distance image acquisition method in a case where the fourth drive mode is set. The steps common to the first drive mode shown in FIG. 11 are represented by the same step numbers, and detailed description thereof will not be repeated.

An exposure control step in a case where the fourth drive mode is set corresponds to Steps S100 and S110 in the first drive mode, and the processing of Step S120 to Step S150 is omitted.

Next, the distance image is generated based on the first data $L_1$ (that is, the distance information D for each light receiving element of the distance image sensor 14) corresponding to the exposure by the first exposure control acquired in Step S110 (Step S400).

Since the fourth drive mode which is set in a case of an imaging environment, in which there is no influence of the reflectance of the subject and there is no influence of ambient light does not require the acquisition of the exposures for use in eliminating the influence of the reflectance of the subject and the influence of ambient light and does not require calculation among a plurality of exposures, among the first drive mode to the fourth drive mode, the least shot noise and the highest distance measurement accuracy are achieved.

An aspect to which the invention is applicable is not limited to a distance image acquisition apparatus having a single function of acquiring a distance image, and a general digital camera or a video camera which can acquire a color image may have the distance image acquisition function. The invention is also applicable to mobile apparatuses, which have, in addition to the distance image acquisition function, other functions (a call handling function, a communication function, and other computer functions), in addition to cameras having a principal function of distance image acquisition. As other aspects to which the invention is applicable, for example, mobile phones, smartphones, personal digital assistants (PDAs), portable game machines, and the like having a camera function are exemplified. Hereinafter, an example of a smartphone to which the invention is applicable will be described.

<Configuration of Smartphone>

Figure 15:
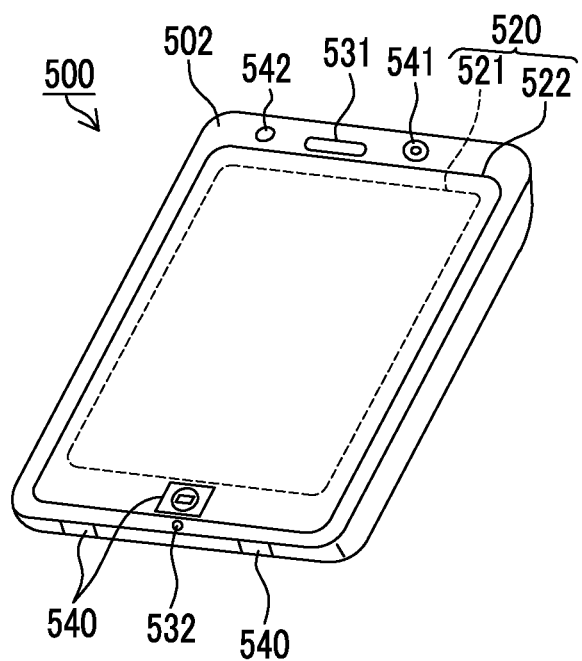
FIG. 15 is an appearance diagram of a smartphone which is an embodiment of the distance image acquisition apparatus.

FIG. 15 shows the appearance of a smartphone 500 which is an embodiment of a distance image acquisition apparatus.

The smartphone 500 shown in FIG. 15 has a flat plate-shaped housing 502, and comprises a display input unit 520 in which a display panel 521 as a display unit and an operation panel 522 as an input unit are integrated on one surface of the housing 502. The housing 502 comprises a speaker 531, a microphone 532, an operating unit 540, a camera unit 541, and an LED light emission unit 542. The configuration of the housing 502 is not limited thereto, and for example, a configuration in which the display unit and the input unit are independent from each other may be employed, or a configuration having a folding structure or a slide mechanism may be employed.

Figure 16:
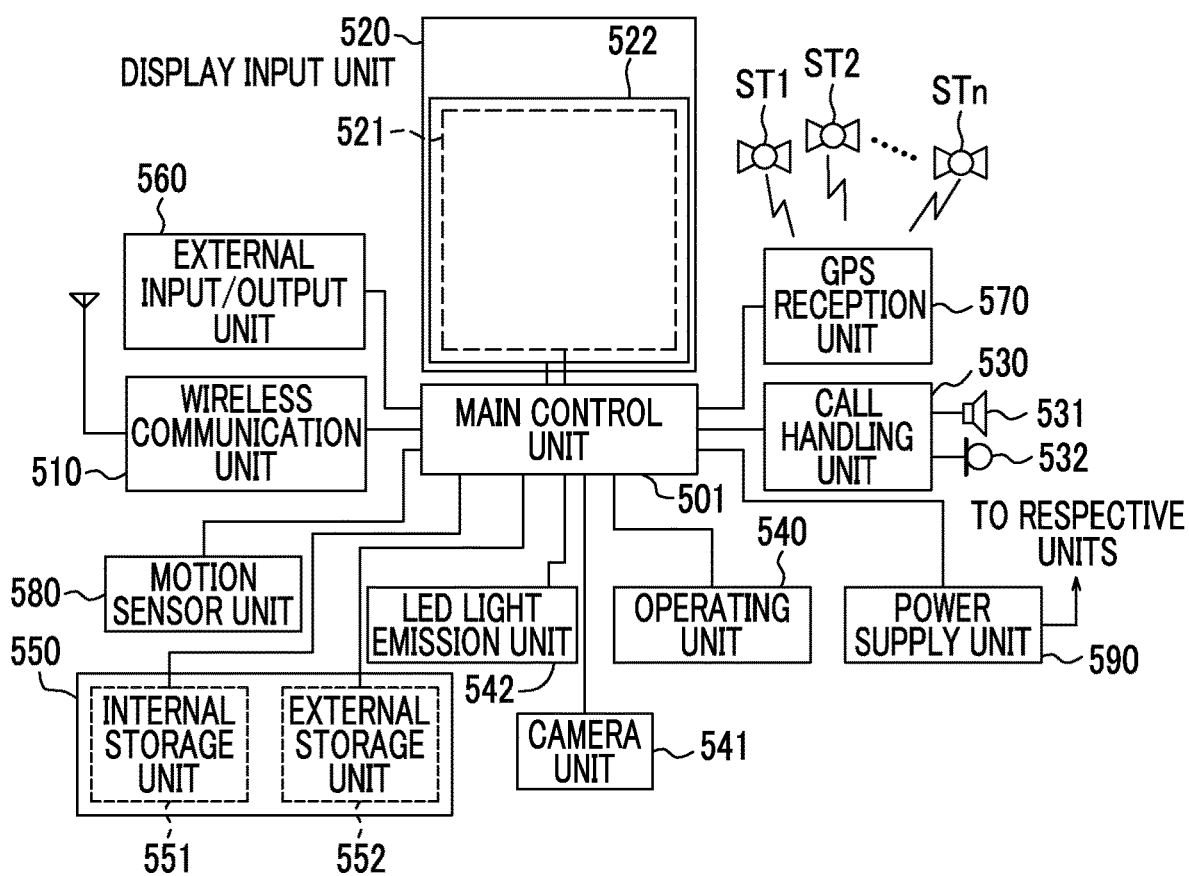
FIG. 16 is a block diagram showing the configuration of the smartphone.

FIG. 16 is a block diagram of the smartphone 500 shown in FIG. 15. As shown in FIG. 16, the smartphone 500 comprises, as principal components, a wireless communication unit 510, a display input unit 520, a call handling unit 530, an operating unit 540, a camera unit 541, a storage unit 550, an external input/output unit 560, a global positioning system (GPS) reception unit 570, a motion sensor unit 580, a power supply unit 590, and a main control unit 501. The smartphone 500 has, as a principal function, a wireless communication function of performing mobile wireless communication through a base station device and a mobile communication network.

The wireless communication unit 510 performs wireless communication with the base station device in the mobile communication network according to an instruction of the main control unit 501. With the use of the wireless communication, transmission and reception of various kinds of file data, such as music data and image data, and electronic mail data, or reception of Web data, streaming data, or the like is performed.

The display input unit 520 is a so-called touch panel which displays images (still images and moving images), text information, or the like to visually transfer information to the user and detects a user's operation on the displayed information under the control of the main control unit 501, and comprises the display panel 521 and the operation panel 522. In a case where a generated three-dimensional image is viewed, it is preferable that the display panel 521 is a three-dimensional display panel.

The display panel 521 uses a liquid crystal display (LCD), an organic electro-luminescence display (OELD), or the like as a display device.

The operation panel 522 is a device which is placed such that an image displayed on a display surface of the display panel 521 is visible, and detects one or a plurality of coordinates operated by a user's finger or a stylus. In a case where the device is operated with the user's finger or the stylus, a detection signal generated due to the operation is output to the main control unit 501. Next, the main control unit 501 detects an operation position (coordinates) on the display panel 521 based on the received detection signal.

As shown in FIG. 15, although the display panel 521 and the operation panel 522 of the smartphone 500 are integrated to constitute the display input unit 520, the operation panel 522 is arranged so as to completely cover the display panel 521. In a case where this arrangement is employed, the operation panel 522 may have a function of detecting a user's operation even in a region outside the display panel 521. In other words, the operation panel 522 may have a detection region (hereinafter, referred to as a display region) for a superimposed portion overlapping the display panel 521 and a detection region (hereinafter, referred to as a non-display region) for an outer edge portion not overlapping the display panel 521 other than the display region.

Although the size of the display region may completely coincide with the size of the display panel 521, both of the size of the display region and the size of the display panel 521 are not necessarily made to coincide with each other. The operation panel 522 may have two sensitive regions including an outer edge portion and an inner portion other than the outer edge portion. The width of the outer edge portion is appropriately designed according to the size of the housing 502 or the like. As a position detection system which is employed in the operation panel 522, a matrix switching system, a resistive film system, a surface acoustic wave system, an infrared system, an electromagnetic induction system, an electrostatic capacitance system, and the like are exemplified, and any system may be employed.

The call handling unit 530 comprises the speaker 531 and the microphone 532, converts speech of the user input through the microphone 532 to speech data processable in the main control unit 501 and outputs speech data to the main control unit 501, or decodes speech data received by the wireless communication unit 510 or the external input/output unit 560 and outputs speech from the speaker 531. As shown in FIG. 15, for example, the speaker 531 and the microphone 532 can be mounted on the same surface as the surface on which the display input unit 520 is provided.

The operating unit 540 is a hardware key using a key switch or the like, and receives an instruction from the user. For example, the operating unit 540 is a push button type switch which is mounted on a lower surface below the display unit of the housing 502 of the smartphone 500, and is turned on in a case of being pressed with a finger or the like and is brought into an off state by restoration force of the panel or the like in a case where the finger is released.

The storage unit 550 stores a control program or control data of the main control unit 501, address data associated with the name, telephone number, and the like of a communication partner, data of transmitted and received electronic mail, Web data downloaded by Web browsing, and downloaded content data, and temporarily stores streaming data or the like. The storage unit 550 is constituted of an internal storage unit 551 embedded in the smartphone and an external storage unit 552 having a slot for a detachable external memory. Each of the internal storage unit 551 and the external storage unit 552 constituting the storage unit 550 is realized using a memory (for example, a Micro SD (Registered Trademark) memory, such as a flash memory type, a hard disk type, a multimedia card micro type, or a card type, or a storage medium, such as a random access memory (RAM) or a read only memory (ROM).

The external input/output unit 560 plays a role of an interface with all external devices connected to the smartphone 500, and is provided for direct or indirect connection to other external devices through communication or the like (for example, a universal serial bus or the like) or network (for example, the Internet, a wireless local area network (LAN), Bluetooth (Registered Trademark), radio frequency identification (RFID), infrared data association (IrDA), Ultra Wideband (UWB) (Registered Trademark), ZigBee (Registered Trademark), or the like).

The external devices connected to the smartphone 500 are, for example, a wired/wireless headset, a wired/wireless external charger, a wired/wireless data port, a memory card, a subscriber identity module (SIM) card, or a user identity module (UIM) card connected through a card socket, an external audio-video device connected through an audio-video input/output (I/O) terminal, an external audio-video device connected in a wireless manner, a smartphone connected in a wired or wireless manner, a personal computer connected in a wired/wireless manner, a PDA connected in a wired/wireless manner, an earphone, and the like. The external input/output unit can transfer data transmitted from the external devices to the respective components in the smartphone 500 or can transmit data in the smartphone 500 to the external devices.

The GPS reception unit 570 receives GPS signals transmitted from GPS satellites ST1 to STn according to an instruction of the main control unit 501, executes positioning calculation processing based on a plurality of received GPS signals, and detects the position of the smartphone 500 having latitude, longitude, and altitude. When position information can be acquired from the wireless communication unit 510 or the external input/output unit 560 (for example, a wireless LAN), the GPS reception unit 570 can detect the position using the position information.

The motion sensor unit 580 comprises, for example, a three-axis acceleration sensor or the like, and detects physical motion of the smartphone 500 according to an instruction of the main control unit 501. The moving direction or acceleration of the smartphone 500 is detected by detecting physical motion of the smartphone 500. The detection result is output to the main control unit 501.

The power supply unit 590 supplies electric power stored in a battery (not shown) to the respective units of the smartphone 500 according to an instruction of the main control unit 501.

The main control unit 501 is provided with a microprocessor, operates according to the control program or control data stored in the storage unit 550, and integrally controls the respective units of the smartphone 500. The main control unit 501 has a mobile communication control function of controlling respective units of a communication system in order to perform speech communication or data communication through the wireless communication unit 510, and an application processing function.

The application processing function is realized by the main control unit 501 operating according to application software stored in the storage unit 550. The application processing function is, for example, an infrared communication function of controlling the external input/output unit 560 to perform data communication with a device facing the smartphone 500, an electronic mail function of transmitting and receiving electronic mail, a Web browsing function of browsing Web pages, or the like.

The main control unit 501 has an image processing function of displaying video on the display input unit 520, or the like based on image data (still image or moving image data), such as received data or downloaded streaming data. The image processing function refers to a function of the main control unit 501 decoding image data, performing image processing on the decoding result, and displaying an image on the display input unit 520.

The main control unit 501 executes display control on the display panel 521 and operation detection control for detecting a user's operation through the operating unit 540 and the operation panel 522.

With the execution of the display control, the main control unit 501 displays an icon for activating application software or a software key, such as a scroll bar, or displays a window for creating electronic mail. The scroll bar refers to a software key for receiving an instruction to move a display portion of an image which is too large to fit into the display area of the display panel 521.

With the execution of the operation detection control, the main control unit 501 detects a user's operation through the operating unit 540, receives an operation on the icon or an input of text in an entry column of the window through the operation panel 522, or receives a scroll request of a display image through the scroll bar.

In addition, with the execution of the operation detection control, the main control unit 501 has a touch panel control function of determining whether or not an operation position on the operation panel 522 is the superimposed portion (display region) overlapping the display panel 521 or the outer edge portion (non-display region) not overlapping the display panel 521 other than the display region, and controlling the sensitive region of the operation panel 522 or the display position of the software key.

The main control unit 501 may detect a gesture operation on the operation panel 522 and may execute a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the above-described operations.

The camera unit 541 is an imaging device which performs electronic imaging using an imaging element, such as a complementary metal oxide semiconductor (CMOS) or a charge-coupled device (CCD). The above-described distance image acquisition apparatus 10 can be applied to the camera unit 541.

In this case, in the distance image acquisition apparatus 10, it is preferable that light receiving elements for color imaging (light receiving elements of RGB transmitting light in wavelength bandwidths of red (R), green (G), and blue (B)) and a light receiving element transmitting near infrared light for a distance image are mixed in one imaging element. That is, as an imaging element of the camera unit 541, an imaging element in which an R pixel, a G pixel, and a B pixel provided with color filters of RGB and a pixel (a pixel having sensitivity only to infrared light) provided with a visible light cut filter are mixed is preferably used.

The LED light emission unit 542 has a white LED and a near infrared LED, turns on the white LED in a case where the amount of light of the subject is insufficient in an imaging mode of a color image, and emits pulse light from the near infrared LED according to the drive mode in an imaging mode of a distance image. In a case of the smartphone 500 having an infrared communication function, the near infrared LED may be used as a light source of infrared communication.

Under the control of the main control unit 501, the camera unit 541 can convert image data obtained by imaging to compressed image data in a format of, for example, Joint Photographic coding Experts Group (JPEG) or the like and can record compressed image data in the storage unit 550 or can output compressed image data through the external input/output unit 560 or the wireless communication unit 510, and similarly, can record distance image data indicating the distance image in the storage unit 550 or can output the distance image through the external input/output unit 560 or the wireless communication unit 510. In the smartphone 500 shown in FIG. 15, although the camera unit 541 is mounted on the same surface as the display input unit 520, the mounting position of the camera unit 541 is not limited thereto, and the camera unit 541 may be mounted on a rear surface of the display input unit 520, or a plurality of camera units 541 may be mounted. In a case where a plurality of camera units 541 are mounted, the camera unit 541 for imaging may be switched to perform imaging alone, or a plurality of camera units 541 may be used simultaneously to perform imaging.

The camera unit 541 can be used for various functions of the smartphone 500. For example, an image acquired by the camera unit 541 can be displayed on the display panel 521, or an image in the camera unit 541 can be used as one operation input of the operation panel 522. In a case where the GPS reception unit 570 detects the position, the position may be detected with reference to an image from the camera unit 541. In addition, the optical axis direction of the camera unit 541 of the smartphone 500 may be determined or a current use environment may be determined with reference to an image from the camera unit 541 without using the three-axis acceleration sensor or using the three-axis acceleration sensor. Of course, an image from the camera unit 541 may be used within application software.

[Others]

In this embodiment, although the first drive mode to the fourth drive mode are provided, one drive mode is set from the four drive modes, and the exposure control and the calculation processing corresponding to the set drive mode are performed, the invention is not limited thereto, and the invention may have a configuration in which a plurality of two or more drive modes among the first drive mode to the fourth drive mode (four drive modes) are provided, one drive mode is set from a plurality of drive modes, and exposure control and calculation processing corresponding to the set drive mode are performed.

In this embodiment, although pulse light emitted from the pulse light emission unit is applied as near infrared light, the invention is not limited thereto, and for example, light in a wavelength bandwidth other than near infrared light or white light in a wide band, such as white, may be applied.

EXPLANATION OF REFERENCES

10: distance image acquisition apparatus, 12: imaging lens, 14: distance image sensor, 20: central processing unit (CPU), 20A: drive mode setting unit, 20B: distance image generation unit, 20C: brightness detection unit, 20D: determination unit, 22: pulse light emission unit, 24: exposure control unit, 26: drive mode selection unit, 500: smartphone, 541: camera unit, 542: LED light emission unit

What is claimed is:

1. A distance image acquisition apparatus comprising:
   a distance image sensor in which a plurality of light receiving elements are arranged in a two-dimensional manner;
   a pulse light emission unit which irradiates a plurality of subjects within a distance measurement region with pulse light;
   an imaging lens which images reflected light of the pulse light irradiated from at least the pulse light emission unit and reflected from the subjects on the distance image sensor;
   an exposure control unit which controls exposure in the distance image sensor according to a first drive mode; and
   a distance image generation unit which generates a distance image corresponding to distances of the subjects within the distance measurement region based on an output of the distance image sensor subjected to exposure control by the exposure control unit,
   wherein the first drive mode performs first exposure control and second exposure control,
   wherein the first exposure control emits pulse light from the pulse light emission unit, starts exposure after a first predetermined time elapses after the pulse light is emitted from the pulse light emission unit, and ends the exposure after a second predetermined time elapses, to generate a difference in exposure based on a light reception time of the pulse light between the corresponding light receiving elements of the distance image sensor according to at least the distances of the subjects, the first predetermined time being a time until the pulse light emitted by the pulse light emission unit and reflected by a farthest one of the subjects within the distance measure region begins to be received by the light receiving elements, the second predetermined time being a time until the pulse light emitted by the pulse light emission unit and reflected by the farthest one of the subjects finishes being received by the light receiving elements, and
   wherein the second exposure control emits pulse light from the pulse light emission unit and a phase of exposure start with respect to the pulse light is made different from a phase of exposure start with respect to the pulse light of the first exposure control.

2. The distance image acquisition apparatus according to claim 1, wherein:
the second exposure control is exposure control in which pulse light is emitted from the pulse light emission unit, exposure starts simultaneously with the emission of the pulse light, and all of the light receiving elements of the distance image sensor are entirely exposed to the pulse light reflected from the subjects; and
in the first drive mode, the distance image generation unit uses first data and second data acquired from the distance image sensor by the first exposure control and the second exposure control, respectively, and generates the distance image based on division data obtained by dividing the first data by the second data.

3. The distance image acquisition apparatus according to claim 1, wherein:
the second exposure control is exposure control in which pulse light is emitted from the pulse light emission unit, an exposure period is set not to overlap an exposure period by the first exposure control, an exposure time is set to be continuous to an exposure time by the first exposure control, and in a case of totaling an output obtained from the distance image sensor by the first exposure control and an output obtained from the distance image sensor by the second exposure control, an output with entirely exposed to the pulse light reflected from the subjects is obtained; and
in the first drive mode, the distance image generation unit uses first data and second data acquired from the distance image sensor by the first exposure control and the second exposure control, respectively, and generates the distance image based on division data obtained by dividing the first data by addition data obtained by adding the first data and the second data.

4. The distance image acquisition apparatus according to claim 1, further comprising:
a drive mode setting unit configured to selectively set one of the first drive mode and a second drive mode, the second drive mode performing the first exposure control,
wherein, in a case where the second drive mode is set by the drive mode setting unit, the distance image generation unit generates the distance image based on first data acquired from the distance image sensor by the first exposure control.

5. The distance image acquisition apparatus according to claim 1, further comprising:
a drive mode setting unit configured to selectively set one of the first drive mode and a second drive mode, the second drive mode performing the first exposure control; and
an intensity detection unit which detects intensity of ambient light of the subjects,
wherein the drive mode setting unit sets the second drive mode when the intensity of ambient light detected by the intensity detection unit is equal to or less than a threshold set corresponding to measurement accuracy.

6. The distance image acquisition apparatus according to claim 1, further comprising:
a drive mode setting unit configured to selectively set one of the first drive mode and a second drive mode, the second drive mode performing the first exposure control; and
a determination unit which determines whether or not reflectance of the subjects for distance measurement is constant,
wherein, in a case where the determination unit determines that the reflectance of the subjects for distance measurement is constant, the drive mode setting unit sets the second drive mode.

7. The distance image acquisition apparatus according to claim 5, wherein, in a case of tracking the subjects for distance measurement, the determination unit determines that the reflectance of the subjects for distance measurement is constant.

8. The distance image acquisition apparatus according to claim 1, further comprising:
a drive mode setting unit configured to selectively set one of the first drive mode and a second drive mode, the second drive mode performing the first exposure control;
an intensity detection unit which detects intensity of ambient light of the subjects; and
a determination unit which determines whether or not reflectance of the subjects for distance measurement is constant,
wherein, in a case where the intensity of ambient light detected by the intensity detection unit is equal to or less than a threshold set corresponding to measurement accuracy, and the determination unit determines that the reflectance of the subjects for distance measurement is constant, the drive mode setting unit sets the second drive mode.

9. A distance image acquisition method for a distance image acquisition apparatus, which comprises a distance image sensor in which a plurality of light receiving elements are arranged in a two-dimensional manner, a pulse light emission unit which irradiates a plurality of subjects within a distance measurement region with pulse light, and an imaging lens which images reflected light of the pulse light irradiated from at least the pulse light emission unit and reflected from the subjects on the distance image sensor, the distance image acquisition method comprising:
an exposure control step of controlling exposure in the distance image sensor according to a first drive mode; and
a distance image generation step of generating a distance image corresponding to distances of the subjects within the distance measurement region based on an output of the distance image sensor subjected to exposure control in the exposure control step,
wherein the first drive mode performs first exposure control and second exposure control, wherein the first exposure control emits pulse light from the pulse light emission unit, starts exposure after a first predetermined time elapses after the pulse light is emitted from the pulse light emission unit, and ends the exposure after a second predetermined time elapses, to generate a difference in exposure based on a light reception time of the pulse light between the corresponding light receiving elements of the distance image sensor according to at least the distances of the subjects, the first predetermined time being a time until the pulse light emitted by the pulse light emission unit and reflected by a farthest one of the subjects within the distance measurement region begins to be received by the light receiving elements, the second predetermined time being a time until the pulse light emitted by the pulse light emission unit and reflected by the farthest one of the subjects finishes being received by the light receiving elements, and
wherein the second exposure control emits pulse light from the pulse light emission unit and a phase of exposure start with respect to the pulse light is made different from a phase of exposure start with respect to the pulse light of the first exposure control.

* * * * *